United States Patent
Liu et al.

(10) Patent No.: US 11,483,895 B2
(45) Date of Patent: Oct. 25, 2022

(54) INTERACTION BETWEEN WUS AND RRM MEASUREMENT

(71) Applicant: QUALCOMM Incorporated, San Diego, CA (US)

(72) Inventors: Le Liu, Fremont, CA (US); Alberto Rico Alvarino, San Diego, CA (US); Mungal Singh Dhanda, Slough (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/289,435

(22) Filed: Feb. 28, 2019

(65) Prior Publication Data
US 2019/0320490 A1    Oct. 17, 2019

Related U.S. Application Data

(60) Provisional application No. 62/657,630, filed on Apr. 13, 2018.

(51) Int. Cl.
*H04W 76/28* (2018.01)
*H04W 4/70* (2018.01)
(Continued)

(52) U.S. Cl.
CPC ............ *H04W 76/28* (2018.02); *H04W 4/70* (2018.02); *H04W 4/80* (2018.02); *H04W 24/10* (2013.01);
(Continued)

(58) Field of Classification Search
None
See application file for complete search history.

(56) References Cited

U.S. PATENT DOCUMENTS

2019/0223147 A1*   7/2019   Chen .................. H04W 68/005
2020/0029302 A1*   1/2020   Cox .................... H04W 52/0229
(Continued)

FOREIGN PATENT DOCUMENTS

WO    2014113074 A1   7/2014
WO    2017050586 A1   3/2017
WO    2018061766 A1   4/2018

OTHER PUBLICATIONS

Partial International Search Report—PCT/US2019/020387—ISA/EPO—dated May 31, 2019.
(Continued)

*Primary Examiner* — Hong Shao
(74) *Attorney, Agent, or Firm* — Arent Fox, LLP

(57) ABSTRACT

A method, apparatus, and computer-readable medium are provided that improves power savings and reliability of communication for DRX/eDRX modes. A base station may receive an indication from a network entity that a UE is in a DRX/eDRX mode. The base station may configure a WUS mode for the UE corresponding to the DRX mode or the eDRX mode. A UE may receive the WUS mode from the base station. When a UE is configured for relaxed RRM measurements for a first cell and moves to a second cell that supports a relaxed RRM measurement, the UE may return to a regular RRM measurement for a time period. When a UE configured for a WUS mode for a first cell moves to a second cell that supports the WUS mode, the UE may return to the DRX mode or the eDRX mode without the WUS mode for a period of time.

48 Claims, 21 Drawing Sheets

(51) Int. Cl.
    *H04W 4/80*     (2018.01)
    *H04W 24/10*    (2009.01)
    *H04W 52/02*    (2009.01)
    *H04W 68/00*    (2009.01)
    *H04W 72/00*    (2009.01)
    *H04W 72/12*    (2009.01)

(52) U.S. Cl.
    CPC ..... *H04W 52/0229* (2013.01); *H04W 68/005* (2013.01); *H04W 72/005* (2013.01); *H04W 72/1289* (2013.01)

(56) References Cited

U.S. PATENT DOCUMENTS

2021/0014825 A1*  1/2021  Shi ................... H04W 52/0229
2021/0092679 A1*  3/2021  Strom ............... H04W 52/0206

OTHER PUBLICATIONS

Qualcomm Incorporated: "Further Discussion on WUS Configurations and Procedures", 3GPP Draft; R1-1804919 WUS Config, 3rd Generation Partnership Project (3GPP), Mobile Competence Centre, vol. RAN WG1, No. Sanya, China; Apr. 16, 2018-Apr. 20, 2018, Apr. 7, 2018 (Apr. 7, 2018), XP051414257, 8 Pages, Retrieved from the Internet: URL:http://www.3gpp.org/ftp/tsg%5Fran/WG1%5FRL1/TSGR1%5F92b/Docs/ [retrieved on Apr. 7, 2018], Paragraph [02.3]—Paragraph [02.5], Figures 1,2.

International Search Report and Written Opinion—PCT/US2019/020387—ISA/EPO—dated Aug. 5, 2019.

Huawei, et al., "Wake-Up Signal in NB-IoT and MTC", 3GPP TSG-RAN WG2 Meeting #101, R2-1802223, Athens, Greece, Feb. 26-Mar. 2, 2018, 8 Pages, Part 2.3.

Taiwan Search Report—TW108107044—TIPO—dated Mar. 28, 2022.

* cited by examiner

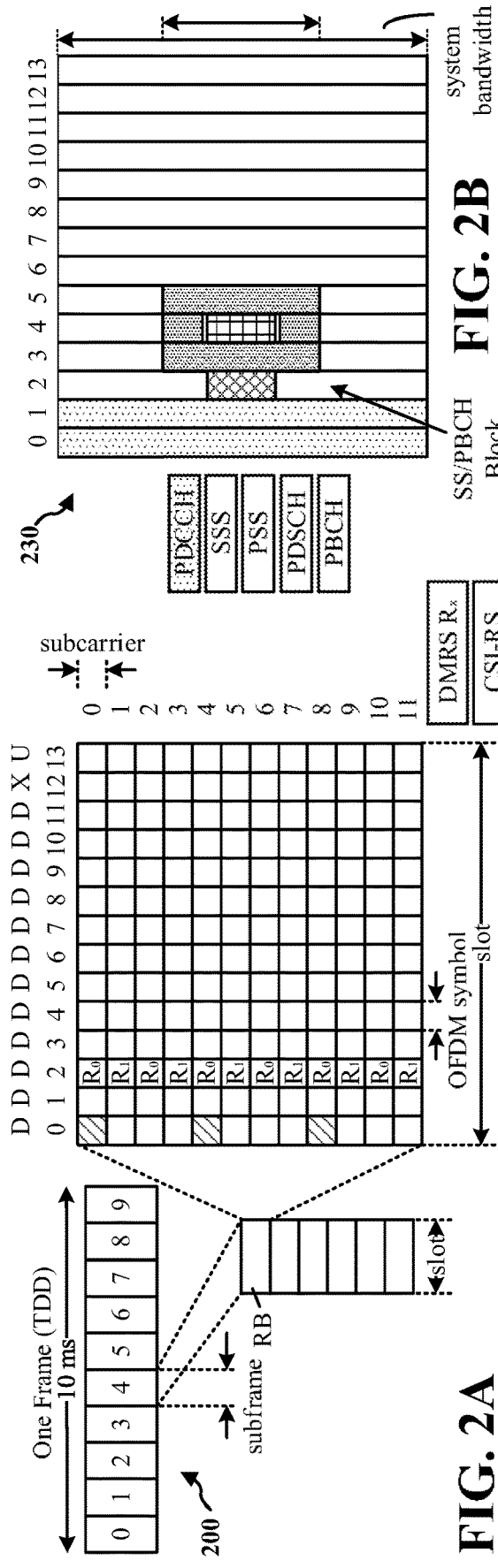
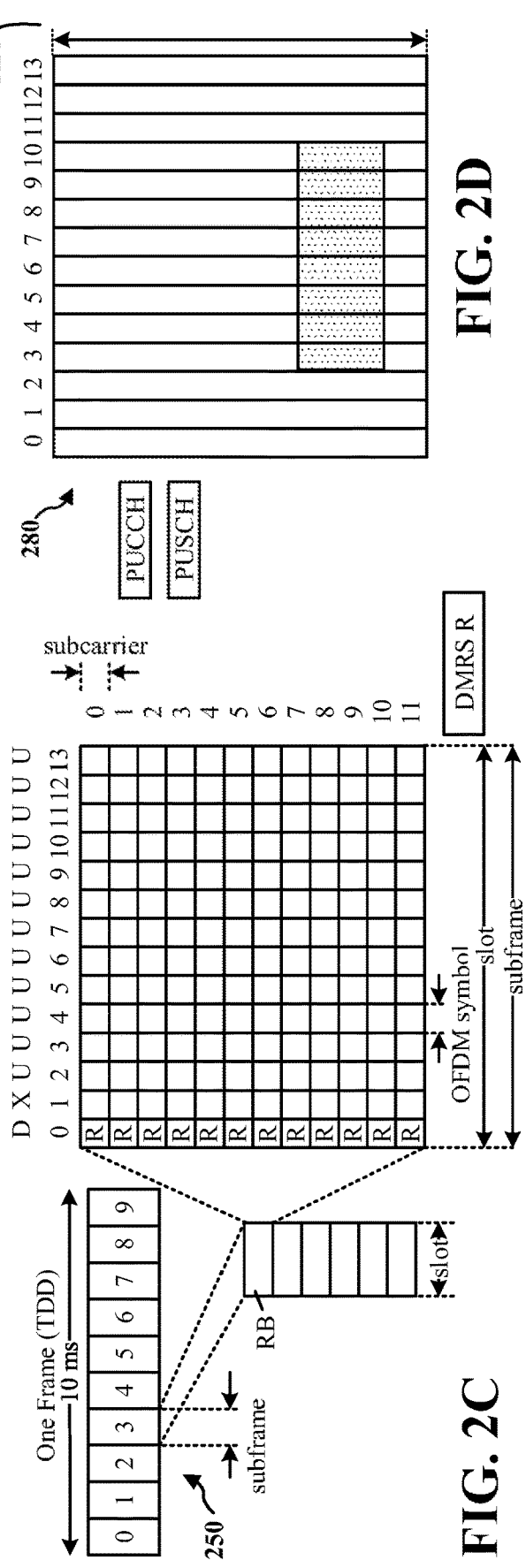
FIG. 2A
FIG. 2B
FIG. 2C
FIG. 2D

Table 2     No. of POs per PTW in NB-IoT

| DRX(ms) | PTW (ms) | | | | | | | | | | | | | | | |
|---|---|---|---|---|---|---|---|---|---|---|---|---|---|---|---|---|
|  | 2560 | 5120 | 7680 | 10240 | 12800 | 15360 | 17920 | 20480 | 23040 | 25060 | 28160 | 30720 | 33280 | 35840 | 38400 | 40960 |
| 1280 | 2 | 4 | 6 | 8 | 10 | 12 | 14 | 16 | 18 | 20 | 22 | 24 | 26 | 28 | 30 | 32 |
| 2560 | 1 | 2 | 3 | 4 | 5 | 6 | 7 | 8 | 9 | 9 | 11 | 12 | 13 | 14 | 15 | 16 |
| 5120 | 1 | 1 | 1 | 2 | 2 | 3 | 3 | 4 | 4 | 4 | 5 | 6 | 6 | 7 | 7 | 8 |
| 10240 | 1 | 1 | 1 | 1 | 1 | 1 | 1 | 2 | 2 | 2 | 2 | 3 | 3 | 3 | 3 | 4 |

FIG. 7A

Table 1     No. of POs per PTW in eMTC

| DRX(ms) | PTW (ms) | | | | | | | | | | | | | | | |
|---|---|---|---|---|---|---|---|---|---|---|---|---|---|---|---|---|
|  | 1280 | 2560 | 3840 | 5120 | 6400 | 7680 | 8960 | 10240 | 11520 | 12800 | 14080 | 15360 | 16640 | 17920 | 19200 | 20480 |
| 320 | 4 | 8 | 12 | 16 | 20 | 24 | 28 | 32 | 36 | 40 | 44 | 48 | 52 | 56 | 60 | 64 |
| 640 | 2 | 4 | 6 | 8 | 10 | 12 | 14 | 16 | 18 | 20 | 22 | 24 | 26 | 28 | 30 | 32 |
| 1280 | 1 | 2 | 3 | 4 | 5 | 6 | 7 | 8 | 9 | 10 | 11 | 12 | 13 | 14 | 15 | 16 |
| 2560 | 1 | 1 | 1 | 2 | 2 | 3 | 3 | 4 | 4 | 5 | 5 | 6 | 6 | 7 | 7 | 8 |

FIG. 7B

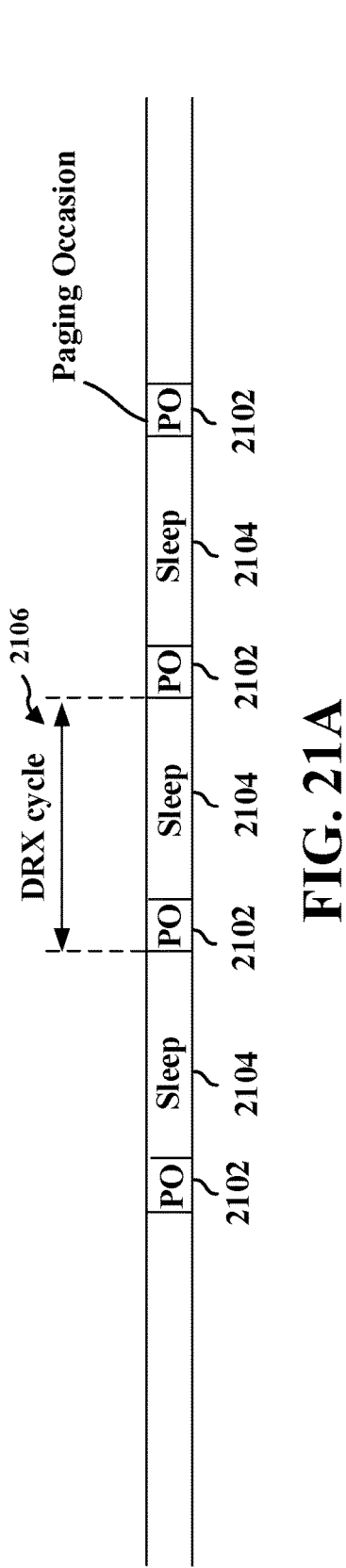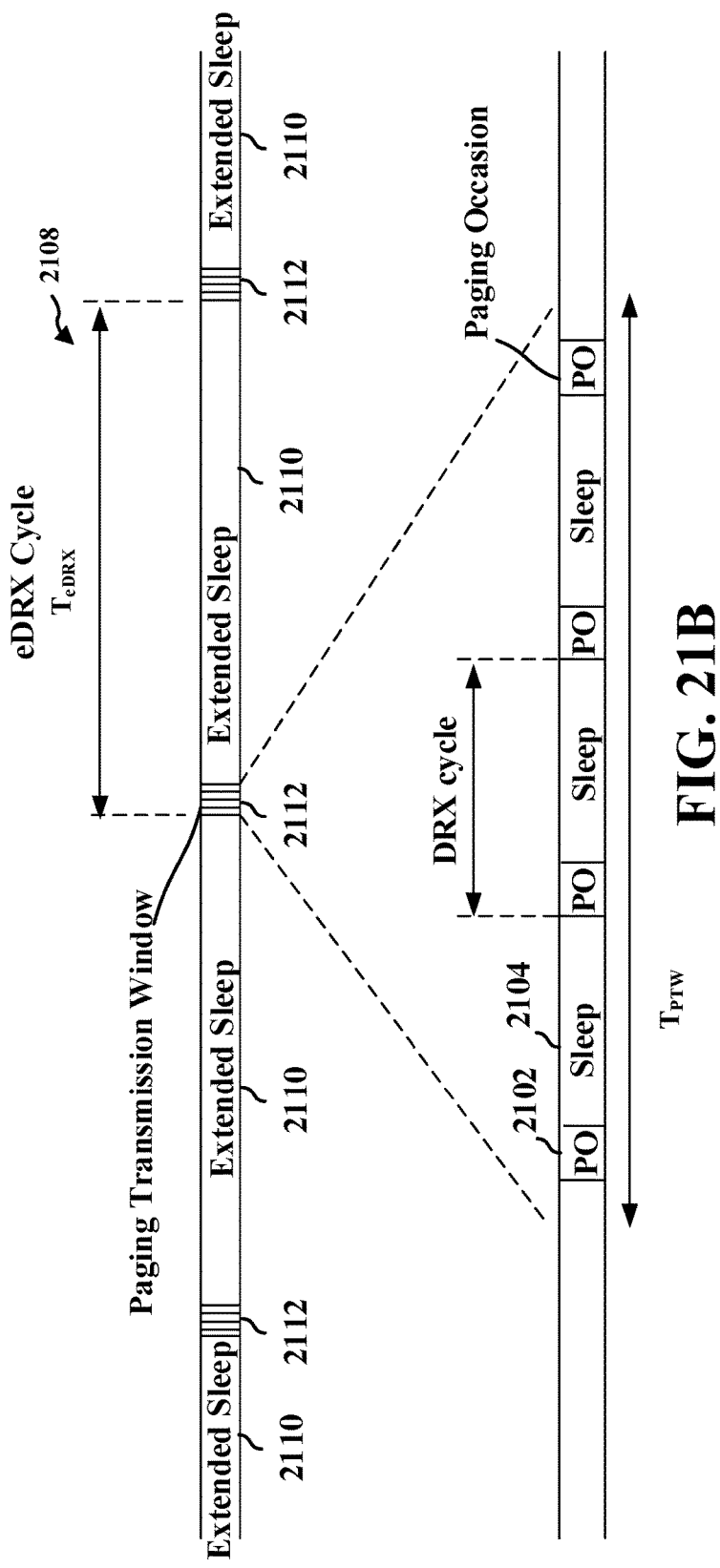
FIG. 21A
FIG. 21B

INTERACTION BETWEEN WUS AND RRM MEASUREMENT

CROSS-REFERENCE TO RELATED APPLICATION(S)

This application claims the priority of U.S. Provisional Application Ser. No. 62/657,630, entitled "INTERACTION BETWEEN WUS AND RRM MEASUREMENT" and filed on Apr. 13, 2018, the disclosure of which is expressly incorporated by reference herein in their entirety.

BACKGROUND

Technical Field

The present disclosure relates generally to communication systems, and more particularly, to wake-up signal (WUS) and radio resource management (RRM) measurement in connection with a discontinuous reception (DRX) mode or an extended DRX (eDRX) mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A User Equipment (UE) may enter a DRX mode or an eDRX mode, e.g., in order to save battery power. The UE in the DRX mode or the eDRX mode may listen for communication from a base station during a paging occasion. The UE in DRX mode or eDRX mode may be configured to attempt to detect a wake up signal (WUS) in order to determine whether to listen during the remainder of the paging occasion. Additionally, the UE may be configured to perform a relaxed Radio Resource Management (RRM) measurement. However, problems may arise regarding interactions between the WUS and the RRM measurement. For example, it may be problematic to support different WUS configurations for DRX and eDRX. As another example, when a UE moves to a new cell, the accuracy of RRM measurements and the detection of communication from the new cell may be reduced based on the UE's WUS configuration and/or relaxed RRM measurement configuration. There is a need for improved communication in connection with the DRX or eDRX mode. The present application provides ways in which the UE and base station may resolve these issues.

In an aspect of the disclosure, a method, a computer-readable medium, and an apparatus are provided for wireless communication at a base station. The apparatus receives an indication from a core network entity (CNE) that a UE is in one of a DRX mode or an eDRX mode, and the base station may configure a WUS mode for the UE corresponding to the DRX mode or the eDRX mode. For example, the CNE may be a mobility management entity (MME).

In another aspect of the disclosure, a method, a computer-readable medium, and an apparatus are provided for wireless communication at a UE. The apparatus may be configured to receive the WUS mode from the base station for one of the DRX mode or the eDRX mode.

In yet another aspect of the disclosure, a method, a computer-readable medium, and an apparatus are provided for wireless communication at a UE. The apparatus may enter a relaxed RRM measurement with a first cell, where the relaxed RRM measurement comprises a single RRM measurement for more than one DRX cycle. When reselecting to a second cell that supports the relaxed RRM measurement, the UE returns to a regular RRM measurement for a time period, where the regular RRM measurement comprises one RRM measurement for each DRX cycle.

In still another aspect of the disclosure, a method, a computer-readable medium, and an apparatus are provided for wireless communication at a UE. The apparatus may enter a DRX mode or an eDRX mode comprising a WUS mode with a first cell. When reselecting to a second cell that supports the WUS mode, the UE returns to the DRX mode or the eDRX mode without the WUS mode for a period of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 7A and FIG. 7B illustrate example numbers of paging occasions per paging time window for a Narrow Band-Internet of Things (NB-IoT) UE and the enhanced machine type communications (eMTC) UE respectively.

FIG. 21A illustrates an example DRX cycle.

FIG. 21B illustrates an example eDRX cycle.

DETAILED DESCRIPTION

Figure 1:
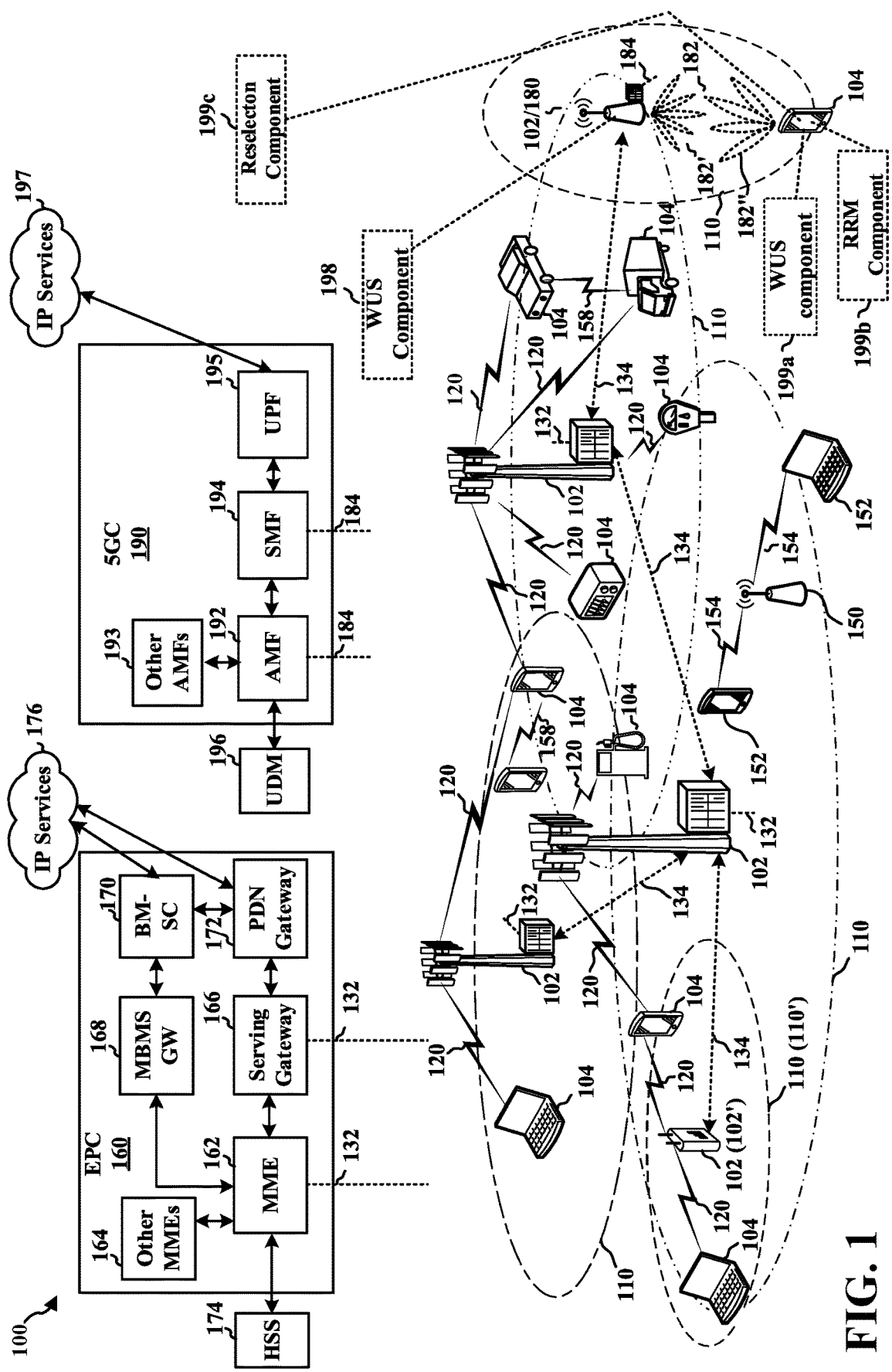
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may receive an indication from a CNE, for example, an MME, that a UE is in one of a DRX mode or an eDRX mode, and the base station 180 may comprise a WUS component 198 configured to configure a WUS mode for the UE 104 corresponding to the DRX mode or the eDRX mode. For example, the base station 180 may configure the WUS for DRX mode. For another example, the base station 180 may configure the WUS for eDRX mode. In some aspects, the UE 104 may comprise a WUS component 199*a* configured to receive the WUS configuration from the base station 180 for one of the DRX mode or the eDRX mode. In certain aspects, the UE may comprise an RRM component 199*b*. The UE 104 may enter a relaxed Radio RRM measurement with a first cell, where the relaxed RRM measurement comprises a single RRM measurement for more than one DRX cycle. When reselecting to a second cell that supports the relaxed RRM measurement, the UE 104 returns to a regular RRM measurement for a period of time, where the regular RRM measurement comprises one RRM measurement for each DRX cycle. In certain aspects, the UE may comprise a reselecting component 199*c*. The UE 104 may enter a DRX mode or an eDRX mode comprising a WUS mode with a first cell. When reselecting to a second cell that supports the WUS mode, the UE 104 returns to the DRX mode or the eDRX mode without the WUS mode for a period of time.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B S R), a power headroom report (PHR), and/or UCI.

Figure 3:
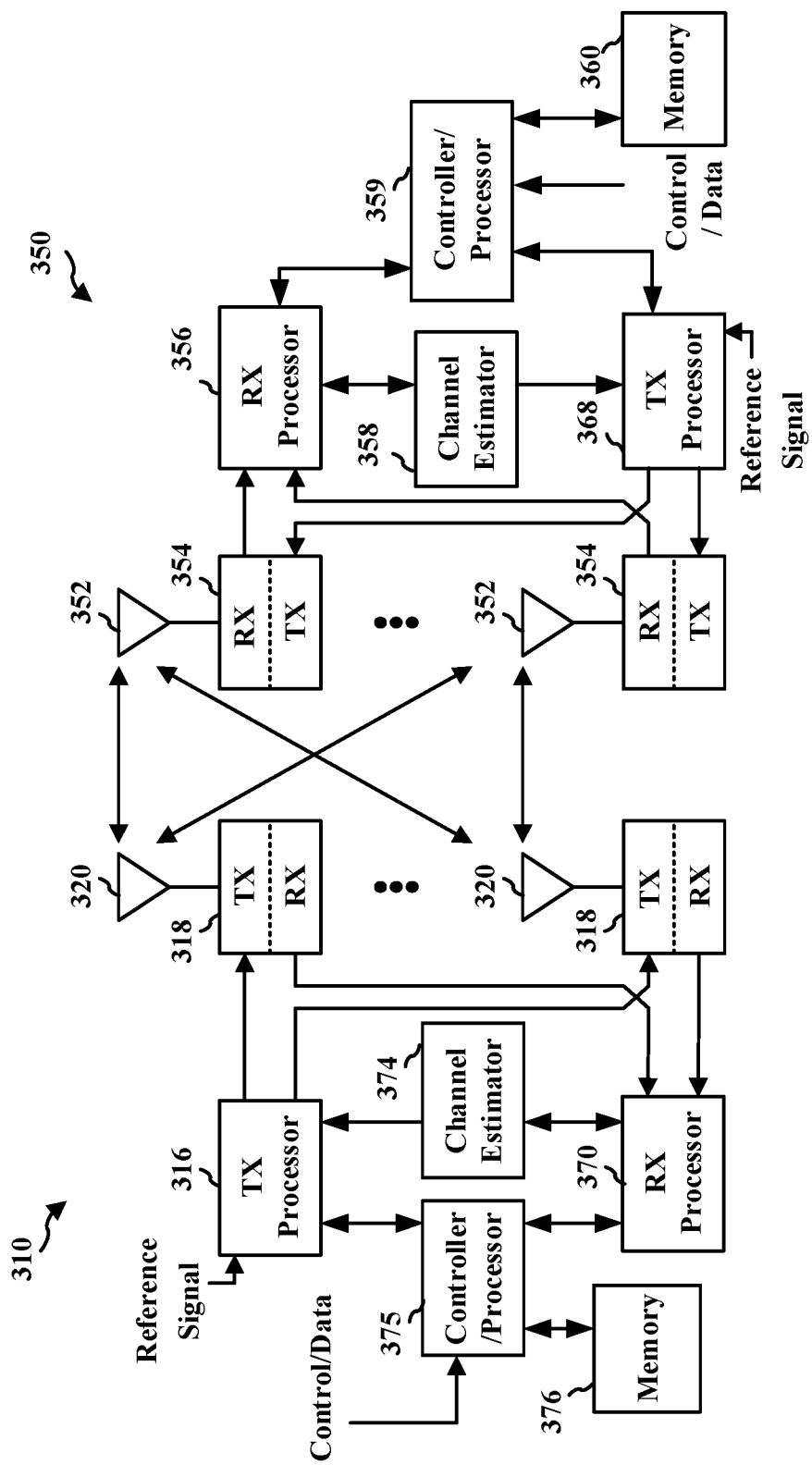
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
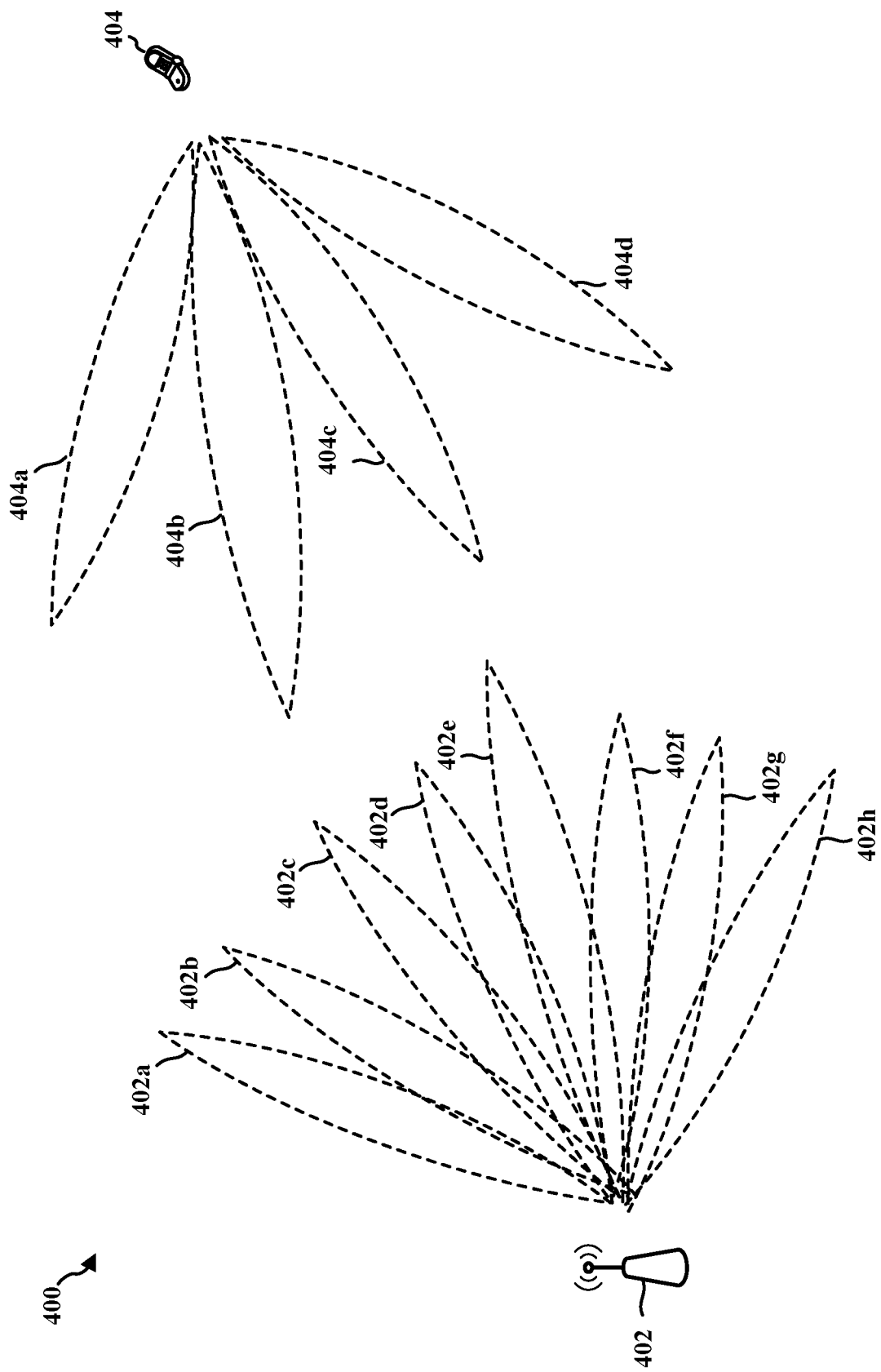
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In a DRX mode, a UE may use a DRX cycle 2106, as illustrated in FIG. 21A. A DRX cycle may include a Paging Occasion (PO) 2102 followed by a sleep portion 2104 during which the UE enters a sleep mode, or reduced power mode in which the UE reduces power consumption by shutting down a radio frequency (RF) function without detecting communication from the base station. At the end of the DRX cycle, the UE may wake up for the next PO. In an eDRX mode, the UE may employ an eDRX cycle 2108 in which the UE remains in the sleep mode for multiple DRX cycles 2106, as illustrated in FIG. 21B. The UE may listen for paging during POs 2102 within a paging transmission window (PTW) 2112, and if no paging is received, the UE may enter an extended sleep 2110 during which the UE does not wake up for multiple POs.

Figure 5:
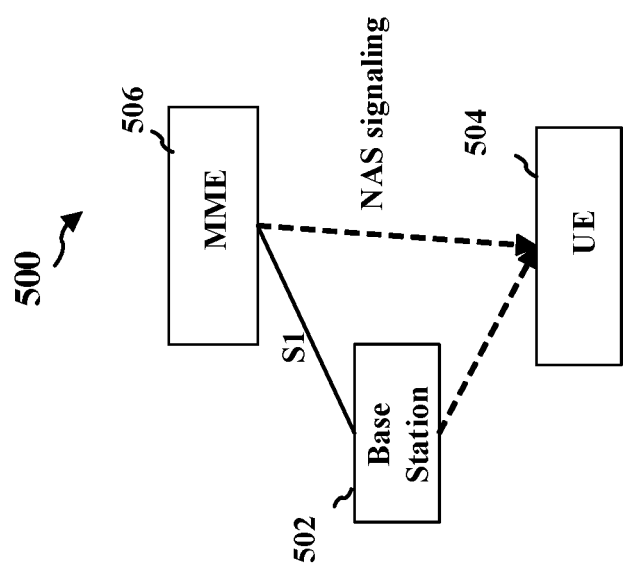
FIG. 5 is a diagram illustrating an example of communication between MME, a base station and a UE.

FIG. 5 is a diagram illustrating an example of communication between a Mobility Management Entity 506 (MME), a base station 502 and a UE 504. If a UE is in an RRC_CONNECTED state, the UE is known at a cell level within the base station with the base station storing the UE information. If a UE is in an RRC_IDLE state, the UE is not known on cell level within the base station. Instead of the base station, the MME stores the UE information. The WUS mode, which provides additional power savings for the UE, may be enabled/disabled by the network. In DRX, the base station may transmit a WUS to the UE 504 to inform the UE 504 whether to monitor the PO in a single DRX cycle. In eDRX, from the UE 504 perspective, a default UE configuration may be based on a one-to-one mapping between a WUS mode and a PO. For every PO, there will be a WUS transmitted to the UE when there is paging during the PO. The WUS will be sent before the associated PO to the UE 504 with a spacing in time, or a gap, between the end of the maximum length of WUS and the associated PO. If there is no paging for the UE during PO, a WUS will not be transmitted to the UE. Thus, the UE may first attempt to detect the WUS. If the UE detects the WUS, the UE may stay awake during the PO to listen for further communication from the base station. Otherwise, the UE will skip the process of detecting during the PO and return to a sleep mode. By using the WUS mode, the UE may save power. An additional WUS configuration in eDRX may include a 1-to-N mapping between the WUS mode and the PO. For example, one WUS may be transmitted to the UE only once out of every N POs. When the UE does not detect a WUS, the UE may go back to sleep for the N POs until the time for the next WUS transmission. When the UE detects the WUS, the UE may monitor the following N PO(s) to detect the paging from the base station. In this way, the UE may save additional power beyond the power savings provided with the 1-to-1 WUS configuration. The WUS design and configuration for eDRX may be configured to allow the network to reach a UE within the PTW for the eDRX cycle so as to satisfy the UE paging response time requirement.

In NB-IoT or eMTC, for example, a UE configured for a WUS mode, may relax RRM measurements to once every M number of DRX cycles. This may be helpful at least for low mobility UEs. For regular RRM measurement, the UE 504 may be configured to perform RRM measurement every DRX cycle. The RRM measurement relaxation, which saves power of the UE, may be enabled/disabled by the network. The WUS can still be enabled by the network when the relaxed RRM measurement is disabled. This might not imply a change in the random access procedure/power control/CE level selection, nor relaxations in the requirements related to the random access procedure. The WUS may provide synchronization of up to a timing and/or frequency offset resulting from not synchronizing with the base station for the M number of DRX cycles. For example, the relaxed RRM measurement configuration may also apply to eDRX mode. Within each PTW, the UE may perform only a single RRM measurement every M DRX cycles. There may be a WUS configuration that enables synchronization for at least a value of duration or M DRX cycles (M>1). The number M of the DRX cycles over which the RRM measurement will be relaxed may be fixed, configurable, or dependent on the DRX cycle. For example, the maximum number of consecutive DRX cycles during which the UE may use the WUS for synchronization and skipping serving cell measurements may be fixed, configurable, or dependent on the DRX cycle. M may be equal to, or less than, the maximum number of consecutive DRX cycles.

In eMTC, a new periodic synchronization signal may be used in connection with a UE configured with a WUS configuration. The new periodic synchronization signal may be configurable (including an OFF/ON configuration). The synchronization signal may indicate whether the additional synchronization signal can provide WUS-related information for a subset of POs or for a group of POs. When the additional synchronization signal provides WUS-related information, there may be an additional WUS/DTX signal, which may be separately configured. When the additional synchronization signal does not provide WUS-related information, there may be an additional WUS/DTX signal. There may be a system information change notification, for example. As well, such a new synchronization signal can be used for non-WUS purposes (e.g. by UEs that need to synchronize after exiting a PSM state). For example, the new synchronization signal can reuse the NB-IoT WUS sequence or may be based on a different sequence.

FIG. 5 illustrates an example configuration 500 for communication between the core network component, the base station 502, and the UE 504 for DRX and eDRX modes. A DRX mode may be different for different RATs. As an example, an NB-IoT DRX mode for a UE may be different than an MTC DRX mode for the UE. The DRX mode may be cell-specific for NB-IoT but UE-specific for MTC. A core network entity, such as the MME 506, may determine the DRX cycle for each UE 504. The MME may notify the DRX cycle configuration to the UE, e.g., via NAS signaling. The MME may also notify the DRX cycle for the UE to the base station 502, e.g., via the S1 interface, which is the interface between the base station 502 and the Core Network (CN). A default DRX cycle may be configured by the base station and broadcast in System Information (SI), e.g., System Information Block 2 (SIB2).

In contrast to DRX, the eDRX may be UE-specific for both NB-IoT UEs and eMTC UEs. The MME may determine the eDRX cycle to ensure the UE 504 can satisfy the paging response time requirements. The MME may notify the eDRX cycle configuration to the UE, e.g., via NAS signaling. The MME may also notify the eDRX cycle configuration, per UE, to the base station 502 via S1 interface. The PTW is the time window during which the UE 504 in eDRX mode searches for communication during the PO, as illustrated in FIG. 21. The PTW may also be UE-specific. The MME may set the PTW length. The MME may notify the PTW cycle configuration to the UE, e.g., via NAS signaling. The MME may indicate the selected PTW for the UE to the base station 502, e.g., via S1 interface.

There may be problems in supporting different WUS configurations for DRX and eDRX. There may be issues in configuring the 1 to N mapping in eDRX and in indicating the configuration to the UE. Furthermore, the parameters related to the WUS may be different for DRX and eDRX. Additional problems may arise when a UE 504 in DRX mode or eDRX mode moves to a new cell. Additional configuration of the UE 504 may be necessary to ensure the accuracy of the RRM measurement.

Figure 6:
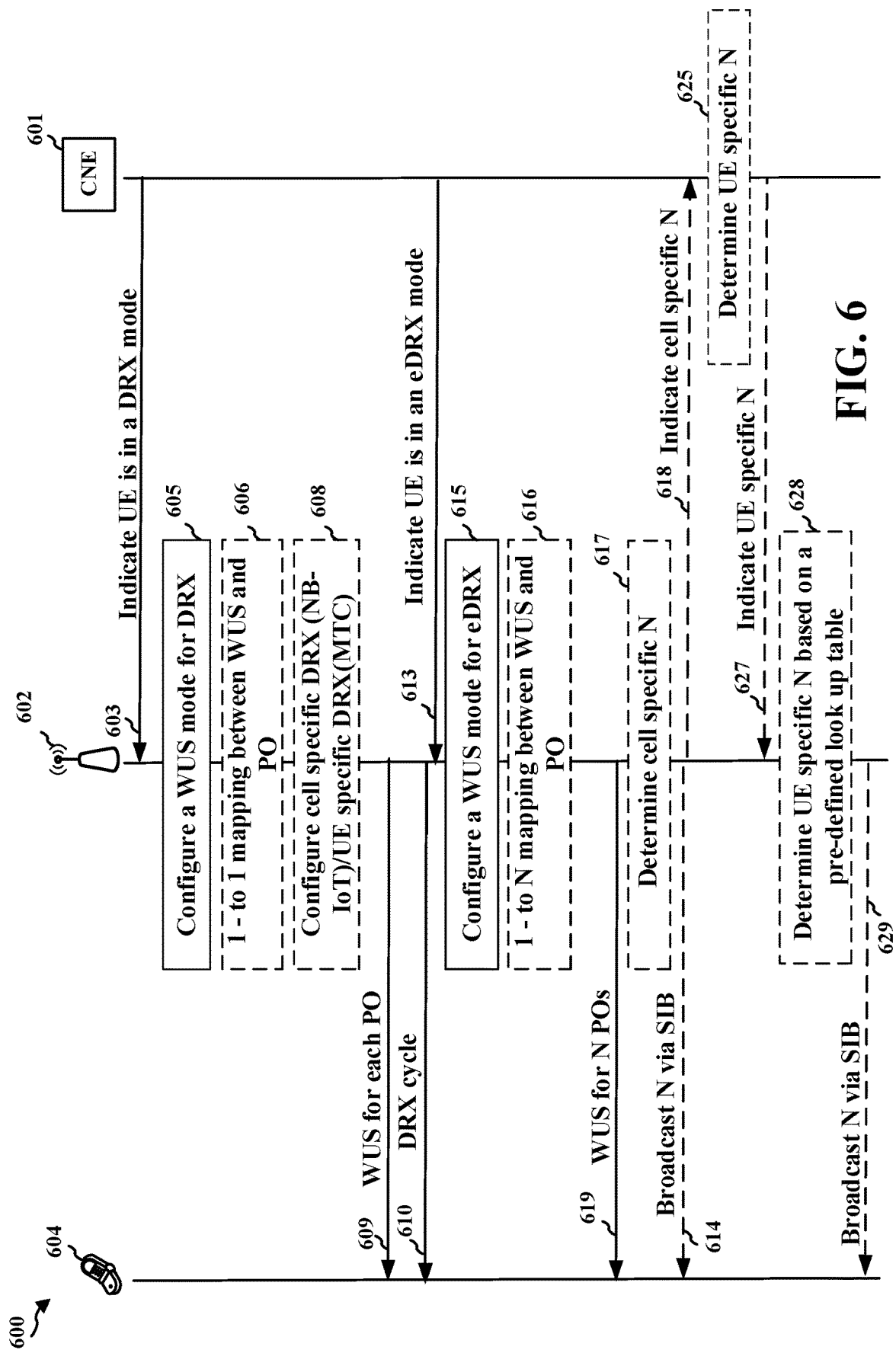
FIG. 6 is a flow diagram illustrating an example solution to support different WUS configurations for DRX and eDRX.

FIG. 6 is a flow diagram illustrating an example solution 600 to support different WUS configurations for DRX and eDRX. In FIG. 6, the base station 602 (e.g., base station 102, 180, 310, 402, 502, 1202, 1502, the apparatus 902) may receive an indication from a core network entity (CNE) 601, for example, a mobility management entity (MME), that a UE 604 (e.g., 104, 350, 404, 504, 904, the apparatus 1204, 1504) is in one of a DRX mode or an eDRX mode, at 603 or 613 respectively. The base station 602 may configure a WUS mode for the UE 604 corresponding to the DRX mode, at 605, or configure a WUS mode for the UE 604 corresponding to the eDRX mode, at 615. The UE 604 may receive the parameters of WUS configuration from the base station 602, e.g., cell-specific parameters, for one of the DRX mode or the eDRX mode, at 609 or 619 respectively. The UE 604 may detect the WUS prior to the PO or several POs based on the received configuration from the base station 602. The UE 604 may receive the parameters of WUS configuration from the MME 601, e.g., UE-specific parameters, for one of the DRX mode or the eDRX mode, at 609 or 619 respectively. The UE 604 may detect the WUS prior to the PO or several POs based on the received configuration from the MME 601.

Thus, the WUS may be configured by the base station 602 for the UE 604. For example, the WUS may be enabled/disabled by the base station 602 via broadcast signaling to the UE 604. If the WUS is being enabled, the UE 604 with WUS-capability may be considered in a WUS mode. The base station 602 may support different WUS configurations for DRX/eDRX when the WUS is enabled. The max WUS duration is dependent on the cell coverage, e.g., scaled by the maximum repetition number of NPDCCH/MPDCCH. It is broadcast by the base station, e.g., in SIB. The starting position of the WUS transmission as well as the gap between the max WUS duration and the associated PO is configured by the base station. For the gap between the WUS max duration and the associated PO, it needs to satisfy the minimum requirement of the UE processing time between the WUS and PO. Since the processing time for DRX and eDRX could be different, a short gap for DRX and a long gap eDRX may be configured by base station. The MME may collect the information of the UE capability and provide an indication of the required gap per UE to the base station. At the base station side, the time gap for DRX may be selected to be at least larger than the maximum required time gap for the UEs in DRX mode. The gap for eDRX may be selected to be at least larger than the maximum required gap of the UEs in eDRX mode.

For example, the base station 602 may receive an indication from the CNE 601 that the UE 604 is in a DRX mode, at 603. The base station 602 may configure the WUS mode to include a WUS for each paging occasion for the UE, at 606. The base station 602 may apply 1 to 1 mapping between the WUS and the PO. The base station 602 may configure a DRX cycle for the UE 604 and the WUS having an associated paging occasion per DRX cycle for the UE, at 608. The base station 602 may broadcast the WUS to the UE, at 609. The UE 604 may receive the DRX cycle configuration from the base station, at 610. The WUS may have an associated paging occasion per DRX cycle for the UE 604.

For an NB-IoT UE, the DRX cycle, configured by the base station 602, may be cell specific. The UE may be configured to receive a WUS for each configured DRX cycle at the associated paging occasion. As an example, the DRX cycle length in time may be 1.28 s, 2.56 s, 5.12 s or 10.24 s for NB-IoT. For NB-IoT DRX, the base station 602 may choose a minimum DRX cycle of the UEs belong to the cell coverage as the cell-specific DRX. The UE 604 may assume a WUS will be transmitted for each configured DRX cycle at the associated paging occasion.

For an MTC UE, the DRX cycle may be specific to the MTC UE, while the UE is configured to receive a WUS for each configured DRX cycle at the associated paging occasion. As an example, the DRX cycle length in time may be 0.32 s, 0.64 s, 1.28 s, 2.56 s, 5.12 s, etc. for MTC. The UE 604 may assume a WUS will be transmitted for each configured DRX cycle at the associated paging occasion.

As another example, the base station 602 may receive an indication from the CNE 601 that the UE 604 is in an eDRX mode, at 613. The base station 602 may configure the WUS mode to include a single WUS for multiple paging occasions for the UE 604, at 616. The base station 602 may enable 1-to-N mapping between the WUS and the POs, where N is the number of multiple paging occasions.

For example, the number of the multiple paging occasions corresponding to the single WUS may be cell specific. The number, e.g., N, of the multiple paging occasions may be determined by the base station 602, as illustrated at 617. The number N of the multiple paging occasions may be broadcast to the UE 604 in system information block (SIB). The configured number of the multiple paging occasions may also be indicated by the base station to the CNE 601. For example, the eDRX cycle may be 20.48 s, 40.96 s, . . . , or 3 hours for NB-IoT UE, and may be 10.24 s, 20.48 s, . . . , 44 min, etc. for MTC. The UE 604 may receive an indication of the number of the multiple paging occasions in a broadcast of system information block (SIB), at 614. In this way, the configured cell specific number of the multiple paging occasions may be set as a simple value to help the UE to achieve more gain. The indication to the UE may also be simple.

The WUS may be sent before the $1^{st}$ PO every N POs within the PTW. If the UE does not find the WUS, the UE skips monitoring the N POs. This enables the UE to spend more time in a sleep mode and provides for greater power savings. Otherwise, the UE monitors each PO for possible paging within the N PO duration. The gap between the WUS and the 1st PO of the N associated POs may be configured by the base station. As the gap for eDRX could be larger than that of DRX mode, the UE may wake up early to search the WUS every N DRX cycles within a PTW. If the UE detects the WUS, the UE may proceed to monitor for paging detection. Alternatively, the base station may configure the longer gap for the $1^{st}$ WUS in the PTW and a shorter gap for the remaining WUS in the PTW. In this example, the UE may wake up early to detect the $1^{st}$ WUS but not for the remaining WUS in the PTW. The UE may monitor for communication from the base station during the time between the $1^{st}$ detection of WUS and PTW.

The base station may configure the UE to attempt to detect the paging directly even without detecting WUS in the duration of last N DRX cycles in a PTW when 1-to-N DRX mapping is configured for eDRX mode. The UE may select at least one of the last N POs, e.g., the last PO or randomly choose one of the N POs near the end of the PTW. Monitoring for paging even without detecting the WUS can help avoid missing UE the paging, e.g., which might occur if a paging message arrives between the last WUS for the associated N POs and the end of the PTW.

The configured cell-specific N DRX cycles, and/or gap for eDRX mode, may be indicated from the base station to MME to let the network know the potential paging latency for the UEs within the coverage of the base station.

As another example, the number of the multiple paging occasions corresponding to the single WUS may UE specific. The number of the multiple paging occasions corresponding to the single WUS may be based on a paging response time requirement of the UE 604.

For example, the number of the multiple paging occasions may be configured by the CNE 601 based on the UE response time requirement, at 625. For a UE with a larger paging response time, the number N of the multiple paging occasions may be set to a larger value. Advantageously, the UE may save more power and still catch up with the paging in this way. For a UE with a smaller paging response time, the number N of the multiple paging occasions may be set to a smaller value. The number of the multiple paging occasions may be indicated to the base station 602 via the S1 interface, as illustrated at 627. The CNE 601 may inform the base station 602 of the UE-specific N, together with eDRX configuration and PTW via S1 interface. The CNE 601 also informs UE of the configured number of DRX cycles, e.g., via NAS signaling. For another example, the base station 602, CNE 601, and the UE may determine the number of the multiple paging occasions based on a pre-defined look-up table, as illustrated at 628. The look-up table may be based on at least one of a PTW duration, a DRX cycle duration, and/or an eDRX cycle duration. The PTW may be UE specific. For example, the PTW may be 1.28 s, . . . , 20.48 s for the MTC UE, and 2.56 s, . . . , 40.96 s for the NB-IoT UE. FIGS. 7A and 7B illustrate a few example PTW lengths for NB-IoT or eMTC. For example, the CNE 601 and the base station 602 may calculate the number of the multiple paging occasions based on the pre-defined look-up table of PTW duration, DRX cycle length, and/or eDRX cycle length. For another example, the number of the multiple paging occasions may be known by the CNE 601, the base station 602, or the UE 604 based on the predefined lookup table. The UE 604 may receive an indication of the number of the multiple paging occasions based on the pre-defined look-up table from CNE 601, e.g., via NAS signaling, or from the base station, e.g., via a SIB, as illustrated at 629.

FIG. 7A and FIG. 7B illustrate example look up tables providing numbers of POs per PTW length and DRX/eDRX cycle length for the NB-IoT UE and the eMTC UE respectively. FIG. 7A and FIG. 7B illustrate relationships between the PTW duration, and the DRX cycle length. As shown in FIG. 7A, for the NB-IoT UE, there may be different PTW durations and different DRX cycles. Tmax may correspond to a length in time of a maximum number of consecutive DRX cycles during which the UE may use the WUS for synchronization and skip serving cell measurements. Tmax may be configured e.g., based on the required response time latency or predefined, e.g. as the largest DRX cycle If the largest duration of N*DRX cycle length needs to be smaller than a value Tmax, the value of N may be calculated as N=Tmax/DRX cycle length. For example, when PTW is about 40.96 s, and the DRX cycle is about 5.12 s, the corresponding number of DRX cycles is 8 and the number N of the multiple paging occasions may be 2 if Tmax=10.24. The number of WUS required within the PTW could be calculated as Number of WUS=PTW length/Tmax. Alternatively, Tmax may be implicitly indicated, e.g., scaled by eDRX cycle. A lower requirement for the paging response time may correspond to a longer eDRX cycle, so that the N may be a function of the DRX cycle, PTW and the eDRX cycle. FIG. 7A and FIG. 7B are only for the purpose of illustrating the relationship between the number of the multiple paging occasions and the UE's parameters. The values may vary from those in the examples of FIGS. 7A and 7B.

Figure 8:
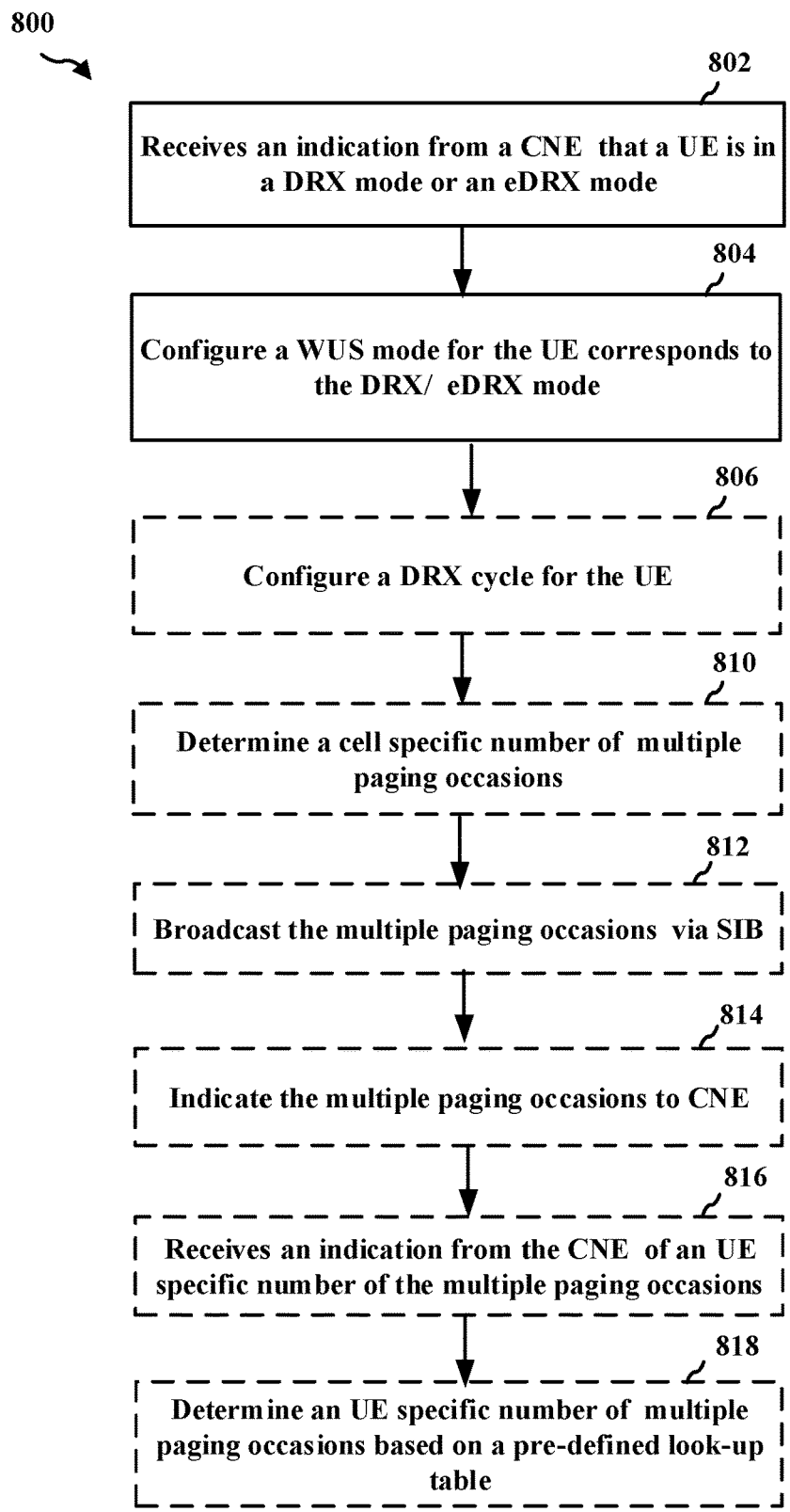
FIG. 8 is a flowchart of a method of wireless communication.

FIG. 8 is a flowchart 800 of a method of wireless communication. The method may be performed by a base station (e.g., base station 102, 180, 310, 402, 502, 602, 1202, 1502, the apparatus 902) communicating with a CNE, for example, a MME, and a UE (e.g., UE 104, 350, 404, 504, 904, the apparatus 1204, 1504). The wireless communication may comprise 5G NR communication, as described herein. The wireless communication may comprise NB-IoT communication and/or eMTC communication. Optional aspects are illustrated with a dashed line.

If a UE is in RRC_CONNECTED state, a base station may store the UE's information, e.g., the UE may be known to the cell. If a UE is in RRC_IDLE state, the UE might not be known on a cell level within the base station. The MME may store UE information instead of the base station. A WUS mode, which saves power of the UE, may be enabled/disabled by the network. By using the WUS mode, the UE may save power and increase communication reliability. The method provides a solution to problems in supporting different WUS configurations, e.g., for DRX and eDRX.

At 802, the base station receives an indication from a network entity, e.g., a CNE, that a UE is in one of a DRX mode or an eDRX mode. The CNE may comprise an MME. As an example, the base station may receive an indication from a CNE that a UE is in the DRX mode. For example, FIG. 6 illustrates an example of an indication 603. As another example, the base station may receive an indication from the CNE 601 that a UE is in the eDRX mode. For example, FIG. 6 illustrates an example of an indication 613.

At 804, the base station configures a WUS mode for the UE 604, where the WUS mode corresponds to the DRX mode or the eDRX mode for the UE. The WUS mode may be different for DRX and eDRX. For example, referring back to FIG. 6, the base station 602 may configure a WUS mode for the UE 604 corresponding to the DRX mode, at 605, or configure a WUS mode for the UE 604 corresponding to the eDRX mode, at 615. The base station may configure, the WUS mode to include a WUS for each PO for the UE. the base station 602 may configure the WUS mode to include a WUS for each paging occasion for the UE, at 606. The base station 602 may apply 1 to 1 mapping between the WUS and the PO. At 806, the base station may also configure a DRX cycle for the UE 806. For example, for an NB-IoT UE, the base station may configure the DRX cycle to be cell specific. The UE may be configured to receive a WUS for each configured DRX cycle at the associated PO. In another example, for an MTC UE, the DRX cycle may be specific to the MTC UE, while the UE is configured to receive a WUS for each configured DRX cycle at the associated paging occasion. For example, referring back to FIG. 6, the base station 602 may configure a DRX cycle for the UE 604 and the WUS having an associated paging occasion per DRX cycle for the UE, at 608.

At 810, the number N of the cell specific multiple paging occasions may be determined by the base station 810. For example, referring back to FIG. 6, the base station may configure the WUS mode to include a single WUS for multiple paging occasions for the UE. The base station may enable 1-to-N mapping between the WUS and the POs, where N is the number of multiple paging occasions, as described in connection with 616 at FIG. 6. As an example, the number of the N multiple paging occasions corresponding to the single WUS may be cell specific. The number, e.g., N, of the multiple paging occasions may be determined by the base station 602, as illustrated at 617.

At 812, the number of the multiple paging occasions may be broadcast to the UE in system information, e.g., a SIB. For example, referring back to FIG. 6, the number N of the multiple paging occasions may be broadcast to the UE 604 in SIB. The configured number of the multiple paging occasions may also be indicated by the base station to the CNE 601. For example, the eDRX cycle may be 20.48 s, 40.96 s, . . . , or 3 hours for NB-IoT UE, and may be 10.24 s, 20.48 s, . . . , 44 min, etc. for MTC. The UE 604 may receive an indication of the number of the multiple paging occasions in a broadcast of system information block (SIB), at 614. In this way, the configured cell specific number of the multiple paging occasions may be set as a simple value to help the UE to achieve more gain. The indication to the UE may also be simple.

At 814, the configured number N of the multiple paging occasions may also be indicated by the base station to the CNE. For example, FIG. 6 illustrates the base station 602 indicating the cell specific N to the core network at 618. In this way, the configured cell specific number of the multiple paging occasions may be set as a simple value to help the UE to achieve more gain. The indication to the UE may also be simple.

At 816, the base station may receive an indication from the CNE of an UE specific number of the multiple paging occasions. For example, referring back to FIG. 6, the number of the multiple paging occasions corresponding to the single WUS may UE specific. The number of the multiple paging occasions corresponding to the single WUS may be based on a paging response time requirement of the UE 604. For example, the number of the multiple paging occasions may be configured by the CNE 601 based on the UE response time requirement, at 625. For a UE with a larger paging response time, the number N of the multiple paging occasions may be set to a larger value. Advantageously, the UE may save more power and still catch up with the paging in this way. For a UE with a smaller paging response time, the number N of the multiple paging occasions may be set to a smaller value. The number of the multiple paging occasions may be indicated to the base station 602 via the S1 interface, as illustrated at 627. The CNE 601 may inform the base station 602 of the UE-specific N, together with eDRX configuration and PTW via S1 interface. The CNE 601 also informs UE of the configured number of DRX cycles, e.g., via NAS signaling.

At 818, the base station may determine the UE specific number of the multiple paging occasions based on a pre-defined look-up table. For example, referring back to FIG. 6, the base station 602, CNE 601, and the UE may determine the number of the multiple paging occasions based on a pre-defined look-up table, as illustrated at 628. The look-up table may be based on at least one of a PTW duration, a DRX cycle duration, and/or an eDRX cycle duration. FIGS. 7A and 7B illustrate example look up tables. The PTW may be UE specific. For example, the PTW may be 1.28 s, 20.48 s for the MTC UE, and 2.56 s, . . . , 40.96 s for the NB-IoT UE. For example, the CNE 601 and the base station 602 may calculate the number of the multiple paging occasions based on the pre-defined look-up table of PTW duration, DRX cycle length, and/or eDRX cycle length. For another example, the number of the multiple paging occasions may be known by the CNE 601, the base station 602, or the UE 604 based on the predefined lookup table. The UE 604 may receive an indication of the number of the multiple paging occasions based on the pre-defined look-up table from CNE 601, e.g., via NAS signaling, or from the base station, e.g., via a SIB, as illustrated at 629.

Figure 9:
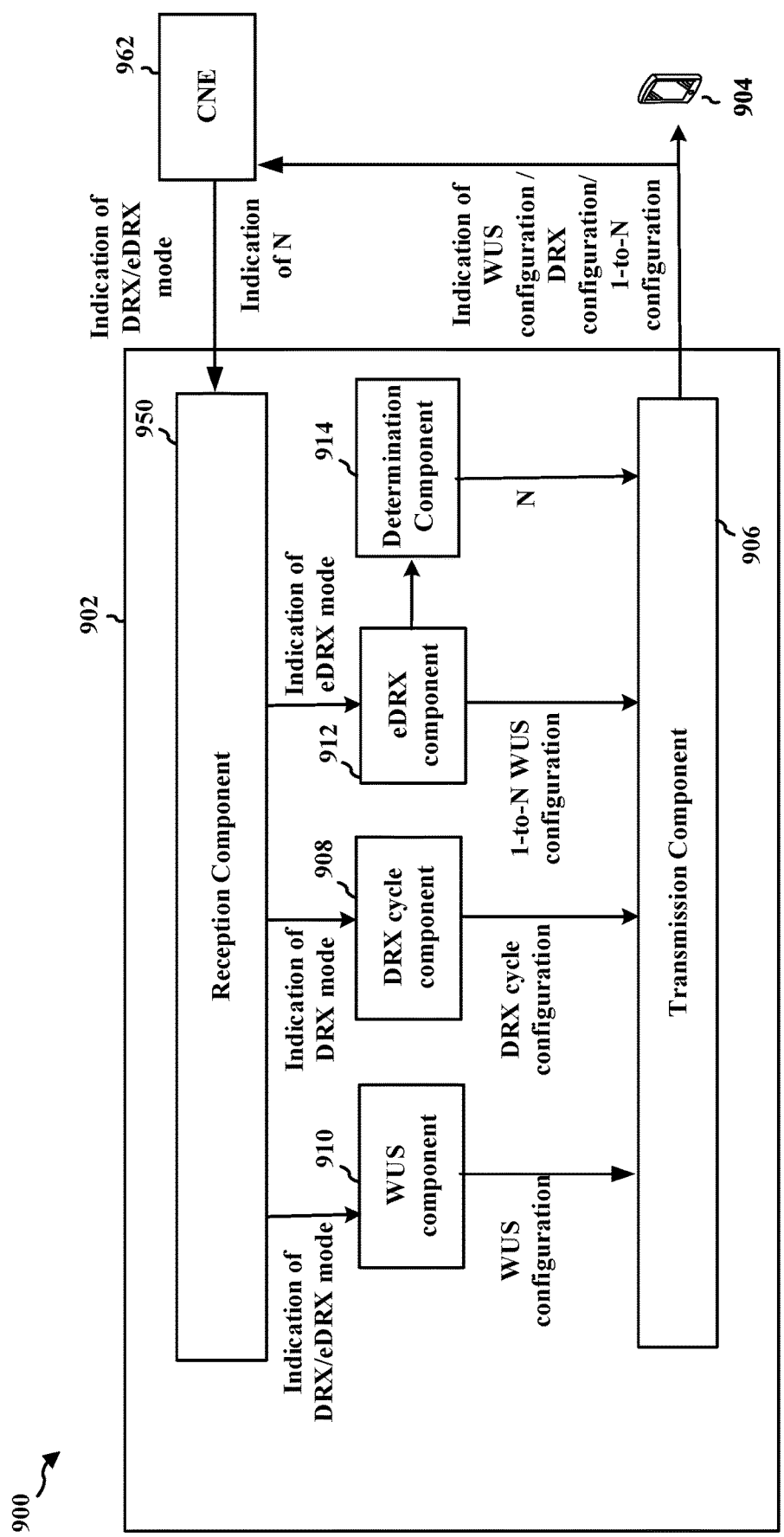
FIG. 9 is a conceptual data flow diagram illustrating the data flow between different means/components in an example apparatus.

FIG. 9 is a conceptual data flow diagram 900 illustrating the data flow between different means/components in an exemplary apparatus 902. The apparatus 902 may be a base station 902 (e.g., base station 102, 180, 310, 402, 502, 602, 1202, 1502) communicating with a UE 904 (e.g., UE 104, 350, 404, 504, the apparatus 1204, 1504). The wireless communication may comprise 5G NR communication including NB-IoT and/or eMTC, as described herein. The apparatus 902 includes a reception component 950 configured to receive communication from a network (e.g., a core network) as well as from UEs. For example, the reception component may be configured to receive an indication from a core network entity 962 that a UE 904 is in one of a DRX mode or an eDRX mode, e.g., as described in connection with 802 in FIG. 8. The apparatus also includes a transmission component 906 configured to transmit communication to the UE and to the network. The apparatus 902 includes a WUS component 910 to configure a wake up signal (WUS) mode for the UE 904, the WUS mode corresponding to indication of the DRX mode or the eDRX mode for the UE received from the core network entity, e.g., as described in connection with 804 in FIG. 8.

The apparatus 902 may include a DRX component 908 to configure a DRX cycle for the UE 904 and the WUS having an associated paging occasion per DRX cycle for the UE 904. For example, the apparatus 902 may receive an indication from the CNE 962 that the UE 904 is in a DRX mode. The apparatus 902 may apply 1-to-1 mapping between the WUS and the PO at the DRX component 908. For an NB-IoT UE, the DRX component may configure a cell specific DRX cycle. For an MTC UE, the DRX cycle may be specific to the MTC UE, while the UE is configured to receive a WUS for each configured DRX cycle at the associated paging occasion.

The apparatus 902 may include an eDRX component 912. The apparatus 902 may receive an indication from the CNE 962 that the UE 904 is in a eDRX mode. The apparatus 902 may configure the WUS mode to include a single WUS for multiple paging occasions for the UE 904, at component 912. The apparatus 902 may enable 1-to-N mapping between the WUS and the POs, where N is the number of multiple paging occasions.

The apparatus 902 may include a determination component 914. For example, the number of the multiple paging occasions corresponding to the single WUS may cell specific. The number of the multiple paging occasions may be determined by the apparatus 902 at component 914. For another example, the number of the multiple paging occasions corresponding to the single WUS may UE specific. The number of the multiple paging occasions corresponding to the single WUS may be based on a paging response time requirement of the UE 904. For example, the number N of the multiple paging occasions may be configured by the CNE 962 based on the UE response time requirement. The number of the multiple paging occasions may be indicated to the apparatus 902 via S1 interface. The CNE 962 may inform the base station 902 of the UE-specific N, together with eDRX and PTW via S1 interface. For another example, the apparatus 902 may determine the number of the multiple paging occasions based on a pre-defined look-up table. The look-up table may be based on at least one of a PTW duration, a DRX cycle duration, and/or an eDRX cycle duration. The PTW is UE specific. For example, the CNE 601 and the apparatus 902 may calculate the number of the multiple paging occasions based on the pre-defined look-up table of PTW duration, DRX cycles, and/or eDRX cycles.

The apparatus 902 includes the transmission component 906. The apparatus 902 may broadcast the WUS to the UE 904. The UE 904 may receive the DRX cycle configuration from the apparatus 902. The WUS may have an associated paging occasion per DRX cycle for the UE 904. For another example, the number of the multiple paging occasions may be broadcast to the UE 904 in SIB. The configured number of the multiple paging occasions may also be indicated to the CNE 962. The UE 904 may receive an indication of the number of the multiple paging occasions in a broadcast of SIB.

The apparatus may include additional components that perform each of the blocks of the algorithm in the aforementioned flowcharts FIG. 6 and FIG. 8. As such, each block in the aforementioned flowcharts FIG. 6 and FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
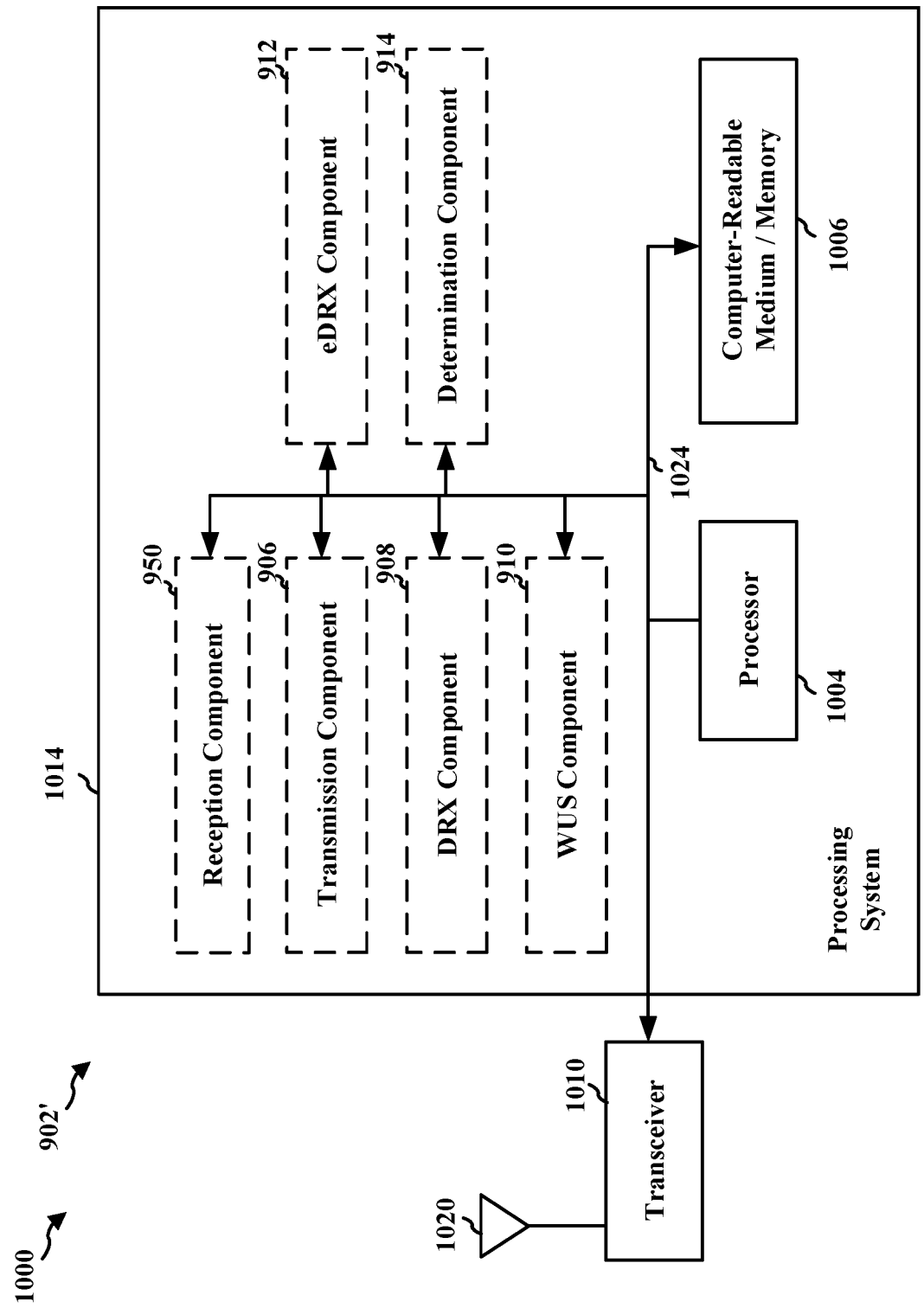
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 950, 906, 908, 910, 912, 914, 950, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 950. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 950, 906, 908, 910, 912, 914, 950. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375.

In one configuration, the apparatus 902/902' for wireless communication includes means for receiving an indication from a core network entity that a UE is in one of a DRX mode or an eDRX mode; means for configuring, by the base station, a WUS mode for the UE, the WUS mode corresponding to the DRX mode or the eDRX mode for the UE; means for configuring, at the base station, a DRX cycle for the UE and the WUS having an associated paging occasion per DRX cycle for the UE; means for determining a number of the multiple paging occasions corresponding to the single WUS, where the number is cell specific; means for determining a number of the multiple paging occasions corresponding to the single WUS, where the number is based on a paging response time requirement of the UE; means for determining the number of the multiple paging occasions corresponding to the single WUS is predefined based on a lookup table; means for broadcasting to the UE in system information block.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
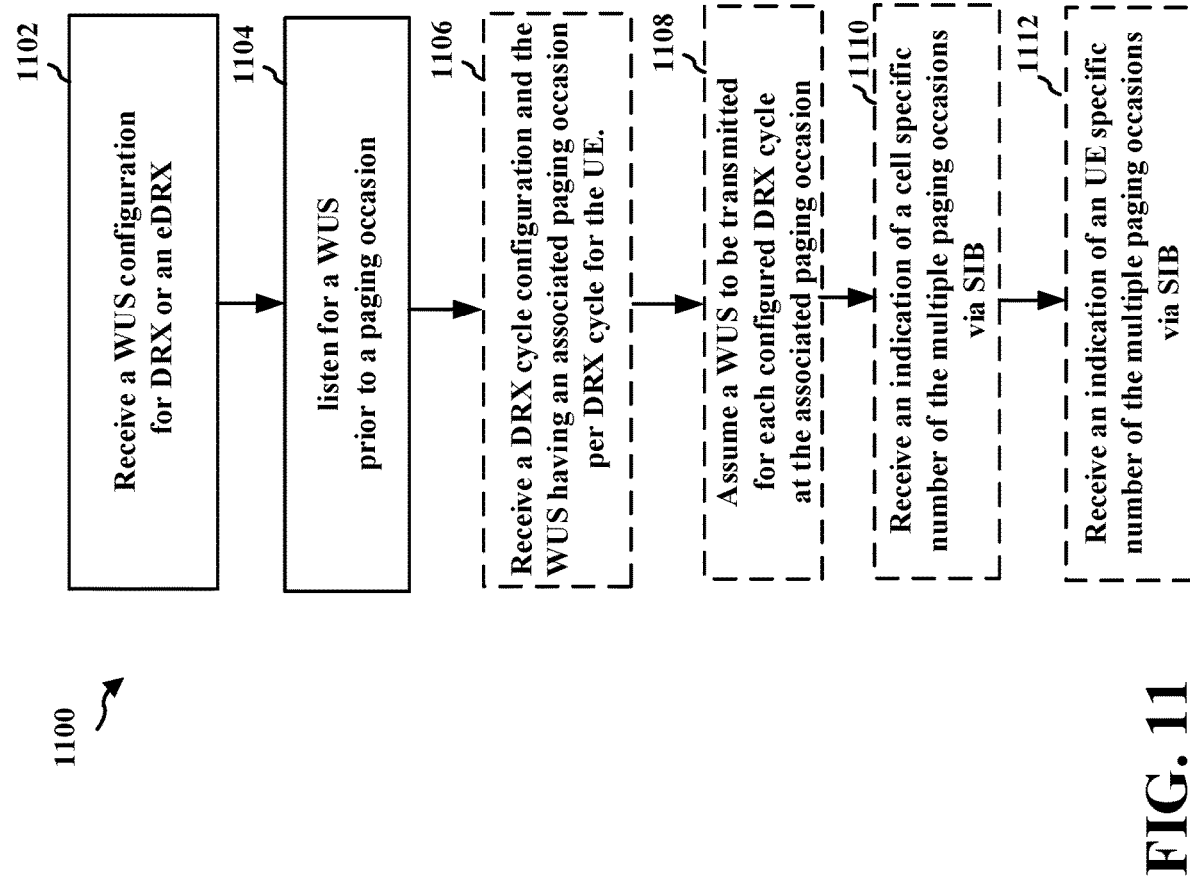
FIG. 11 is a flowchart of a method of wireless communication.

FIG. 11 is a flowchart 1100 of a method of wireless communication. The method may be performed by a UE (e.g., UE 104, 350, 404, 504, 604, 904, the apparatus 1204, 1504) communicating with a base station (e.g., base station 102, 180, 402, 502, 702, 1204, 1504, the apparatus 902, 902'). The wireless communication may comprise 5G NR communication including NB-IoT and/or eMTC communication, as described herein. Optional aspects are illustrated with a dashed line. By using the WUS mode, the UE may save power and increase communication reliability. The method provides a solution to problems in supporting different WUS configurations for DRX and eDRX.

At 1102, the UE receives a WUS configuration from a base station for the UE for one of a DRX mode or an eDRX mode. For example, referring back to FIG. 6, the base station 602 may configure a WUS mode for the UE 604 corresponding to the DRX mode, at 605, or configure a WUS mode for the UE 604 corresponding to the eDRX mode, at 615. The UE 604 may receive the parameters of WUS configuration from the base station 602, e.g., cell-specific parameters, for one of the DRX mode or the eDRX mode, at 609 or 619 respectively.

At 1104, the UE listens for a WUS prior to a paging occasion based on the received configuration from the base station, at. For example, referring back to FIG. 6, the UE 604 may detect the WUS prior to the PO or several POs based on the received configuration from the base station 602. The UE 604 may receive the parameters of WUS configuration from the MME 601, e.g., UE-specific parameters, for one of the DRX mode or the eDRX mode, at 609 or 619 respectively. The UE 604 may detect the WUS prior to the PO or several POs based on the received configuration from the MME 601.

At 1106, the UE may receive, from the base station, a DRX cycle configuration for the UE and the WUS having an associated paging occasion per DRX cycle for the UE. As an example, the WUS configuration received by the UE at 1102 may include a WUS corresponding to each paging occasion, e.g., a 1-to-1 configuration. For example, referring back to FIG. 6, the UE 604 may receive the DRX cycle configuration from the base station, at 610. The WUS may have an associated paging occasion per DRX cycle for the UE 604.

At 1108, the UE may assume a WUS will be transmitted for each configured DRX cycle at the associated paging occasion. For example, referring back to FIG. 6, the UE 604 may receive the parameters of WUS configuration from the base station 602, e.g., cell-specific parameters, for the DRX mode or the eDRX mode, at 609. For an NB-IoT UE, the DRX cycle configured by the base station may be cell specific, such as described in connection with 608 in FIG. 6. For an MTC UE, the DRX cycle may be specific to the MTC UE.

At 1110, the UE may receive an indication of a cell specific number of the multiple paging occasions in a broadcast of system information. As an example, the UE may receive a WUS configuration for the eDRX mode, at 1102, where the WUS configuration includes a single WUS for multiple paging occasions, e.g., a 1-to-N configuration. For example, the number of the multiple paging occasions corresponding to the single WUS may be cell specific and may be determined by the base station. For example, referring back to FIG. 6, the eDRX cycle may be 20.48 s, 40.96 s, . . . , or 3 hours for NB-IoT UE, and may be 10.24 s, 20.48 s, . . . , 44 min, etc. for MTC. The UE 604 may receive an indication of the number of the multiple paging occasions in a broadcast of SIB, at 614. In this way, the configured cell specific number of the multiple paging occasions may be set as a simple value to help the UE to achieve more gain. The indication to the UE may also be simple.

At 1112, the UE may receive an indication of an UE specific number of the multiple paging occasions from the base station via SIB. For example, referring back to FIG. 6, the number of the multiple paging occasions may be configured by the CNE 601 based on the UE response time requirement, at 625. For a UE with a larger paging response time, the number N of the multiple paging occasions may be set to a larger value. Advantageously, the UE may save more power and still catch up with the paging in this way. For a UE with a smaller paging response time, the number N of the multiple paging occasions may be set to a smaller value. The number of the multiple paging occasions may be indicated to the base station 602 via the S1 interface, as illustrated at 627. The CNE 601 may inform the base station 602 of the UE-specific N, together with eDRX configuration and PTW via S1 interface. The CNE 601 also informs UE of the configured number of DRX cycles, e.g., via NAS signaling. For another example, the base station 602, CNE 601, and the UE may determine the number of the multiple paging occasions based on a pre-defined look-up table, as illustrated at 628. The look-up table may be based on at least one of a PTW duration, a DRX cycle duration, and/or an eDRX cycle duration. The UE 604 may receive an indication of the number of the multiple paging occasions based on the pre-defined look-up table from CNE 601, e.g., via NAS signaling, or from the base station, e.g., via a SIB, as illustrated at 629.

Figure 12:
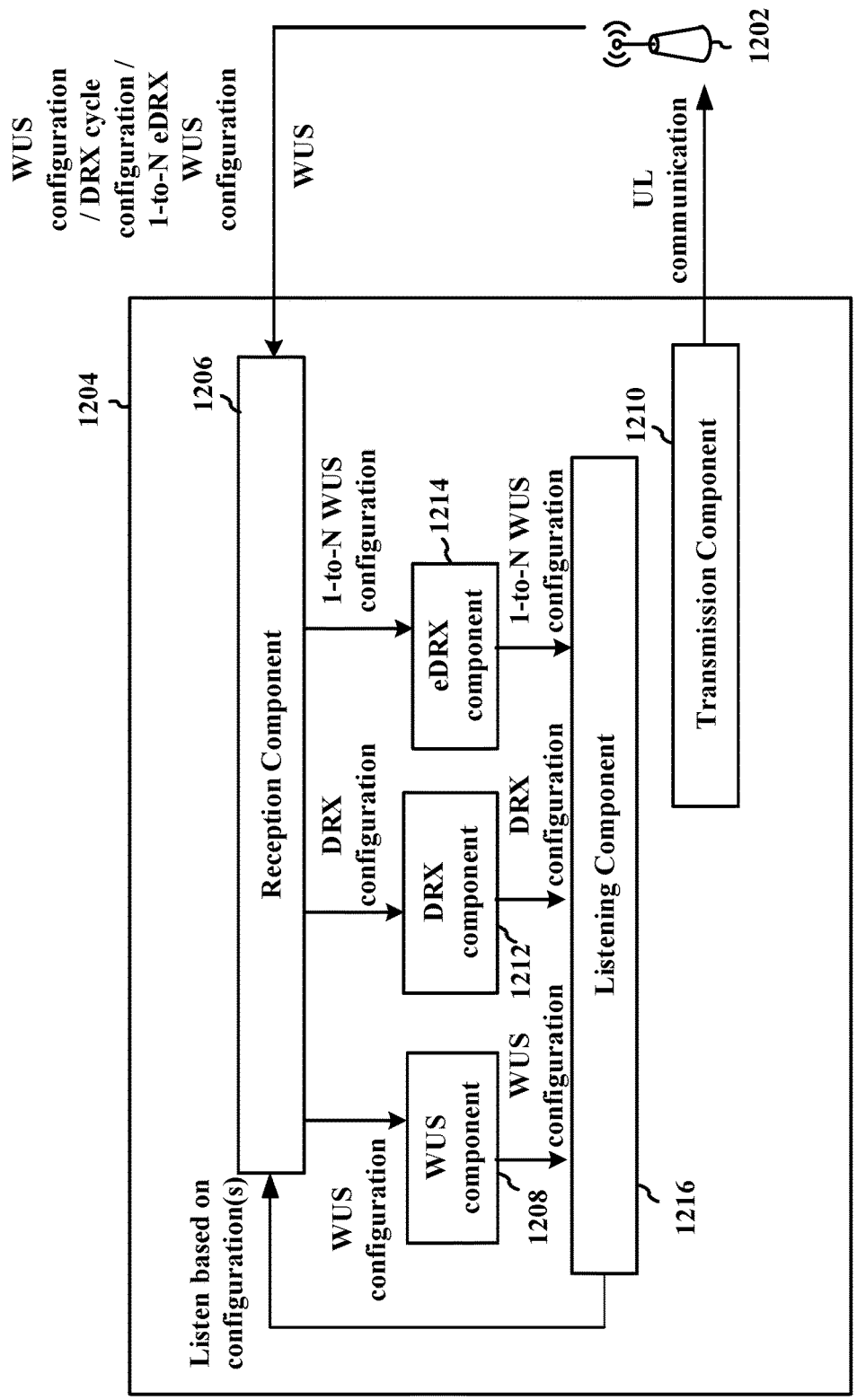
FIG. 12 is a conceptual data flow diagram illustrating the data flow between different means/components in an example apparatus.

FIG. 12 is a conceptual data flow diagram 1200 illustrating the data flow between different means/components in an exemplary apparatus 1204. The apparatus may be a UE (e.g., UE 104, 350, 404, 704, 904) communicating with a base station 1202 (e.g., base station 102, 180, 402, 702, the apparatus 902, 902'). The wireless communication may comprise 5G NR communication, as described herein. The apparatus 1204 includes a reception component 1206 that receives a WUS configuration from a base station 1202 for the UE 1204 for one of a DRX mode or an eDRX mode. The apparatus 1204 includes a WUS component 1208 that listens for a WUS prior to a paging occasion based on the received configuration from the base station 1202.

The apparatus 1204 may include a DRX component 1212 to receive, from the base station 1202, a DRX cycle configuration for the UE 1204 and the WUS having an associated paging occasion per DRX cycle for the UE. For an NB-IoT UE, the DRX cycle may be cell specific. For an MTC UE, the DRX cycle may be specific to the MTC UE, while the UE 1204 is configured to receive a WUS for each configured DRX cycle at the associated paging occasion.

The apparatus 1204 may include an eDRX component 1214. The apparatus 1204 may receive an indication that the WUS configuration comprises a single WUS for multiple paging occasions. For example, the apparatus 1204 may receive an indication of the number of the multiple paging occasions in a broadcast of system information.

The apparatus may include a listening component 1216 configured to for a WUS prior to a paging occasion based on the received configuration(s) from the base station.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
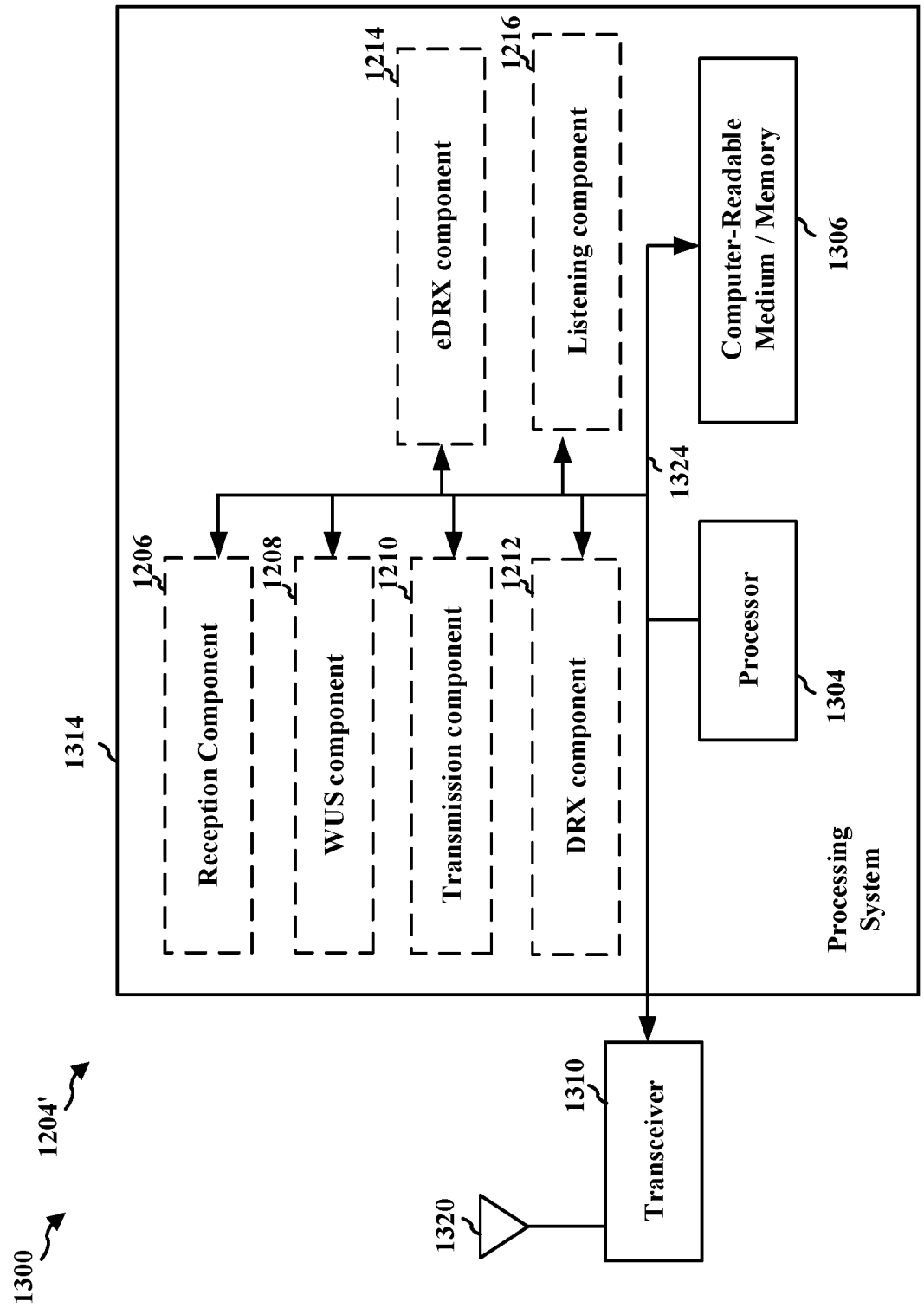
FIG. 13 is a diagram illustrating an example of a hardware implementation for an apparatus employing a processing system.

FIG. 13 is a diagram 1300 illustrating an example of a hardware implementation for an apparatus 1204' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1304. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1014 further includes at least one of the components 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1204/1204' for wireless communication includes means for receiving a WUS configuration from a base station for the UE for one of a DRX mode or an eDRX mode; means for listening for a WUS prior to a paging occasion based on the received configuration from the base station; means for receiving, from the base station, a DRX cycle configuration for the UE and the WUS having an associated paging occasion per DRX cycle for the UE; means for receiving an indication of the number of the multiple paging occasions in a broadcast of system information. The aforementioned means may be one or more of the aforementioned components of the apparatus 1204 and/or the processing system 1314 of the apparatus 1204' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
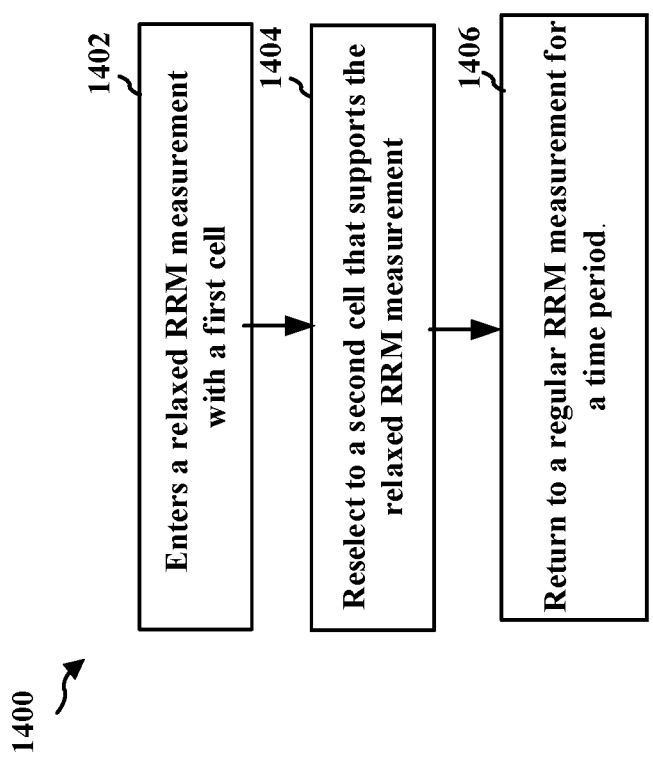
FIG. 14 is a flowchart of another method of wireless communication.

FIG. 14 is a flowchart 1400 of an example of a method 1400 of wireless communication to solve the problem of proper UE behavior after reselecting an new cell. The method may be performed by a UE (e.g., UE 104, 350, 404, 504, 604, 904, the apparatus 1204, 1504) communicating with a base station (e.g., base station 102, 180, 402, 602, 1202, 1502, the apparatus 902, 902'). The wireless communication may comprise 5G NR communication including NB-IoT and/or eMTC communication, as described herein.

The method provides a solution to problems that may arise when a UE in DRX mode or eDRX mode moves to a new cell. The method provides additional configuration of the UE that may be advantageous to ensure the accuracy of the RRM measurement. Optional aspects are illustrated with a dashed line.

At 1402, the UE enters a relaxed RRM measurement mode with a first cell, wherein the relaxed RRM measurement comprises a single RRM measurement for more than one DRX cycle. For example, in the relaxed RRM measurement mode, the UE may perform only a single measurement for multiple cycles, e.g., once every M DRX cycles. M corresponds to an integer value.

At 1404, based on the RRM measurement, the UE may reselect a second cell. The UE may obtain the system information for the second cell in a MIB or a SIB. The second cell may also support the relaxed RRM measurement.

At 1406, upon reselection, the UE returns to a regular RRM measurement mode for a time period, at 1406. The regular RRM measurement may comprise one RRM measurement for each DRX cycle. Even if the first cell and the second cell both support relaxed RRM measurement (e.g., only a single RRM measurement per M DRX cycles), the fall back by the UE to the regular RRM measurement after cell re-selection improves the accuracy of communication with the new cell.

For example, the time period may be based on an indication received from a base station via the broadcast system information. The time period may be calculated based on configuration parameters for the relaxed RRM measurement received from a base station via a broadcast system information. The base station may explicitly or implicitly indicate the time period for the UE to keep regular RRM measurement before go back to the relaxed RRM measurement. For example, the base station may define M*DRX cycles for the UE to perform regular RRM measurement until the time for the next relaxed RRM measurement or the time for several relaxed RRM measurement duration. Alternatively, the UE may keep regular RRM measurement until the next timing for the relaxed RRM measurement within the PTW, or the end of the PTW, if in eDRX mode. Note that the M*DRX configured by the second cell may be same as that of a first cell or different. The UE follows the configuration of the second cell after the cell reselection.

For another example, the time period may be based at least in part on a predefined minimum duration. As an example, the time period may be 5 minutes, or the eDRX cycle length if eDRX is configured and the eDRX cycle length is longer than 5 minutes." For example, the minimum duration may comprise a time length for the UE to perform an RRM measurement to meet an accuracy requirement. The minimum duration may be based on the time that the UE requires to obtain an RRM measurement (e.g., RSRP) to achieve the accuracy requirement. In this way, the UE may have more flexibility to save power. For another example, the minimum duration may comprise a time length corresponding to the UE being identified as a low mobility UE. Based on the RRM measurement of the second cell, the UE may be identified as a low-mobility UE and the relaxed RRM measurement may be applied. There are many methods to identify a low-mobility UE. In one example, the UE may be identified as low mobility based on RRM measurements that the UE measures for the new cell. If the new cell, e.g., current camping cell for the RRC_IDLE UE or current serving cell for the RRC_CONNECTED UE, has the RSRP variation within a configured/pre-defined threshold, the UE is a low mobility UE. In another example, the base station may broadcast a threshold to see whether RSRP changes within a small range. The threshold may be used to determine a low-mobility UE. In another example, the particular types of UEs, such as meters, may be registered as a stationary terminal at CNE, (e.g., MME). The UE can be applied by the RRM measurement relaxation.

Figure 15:
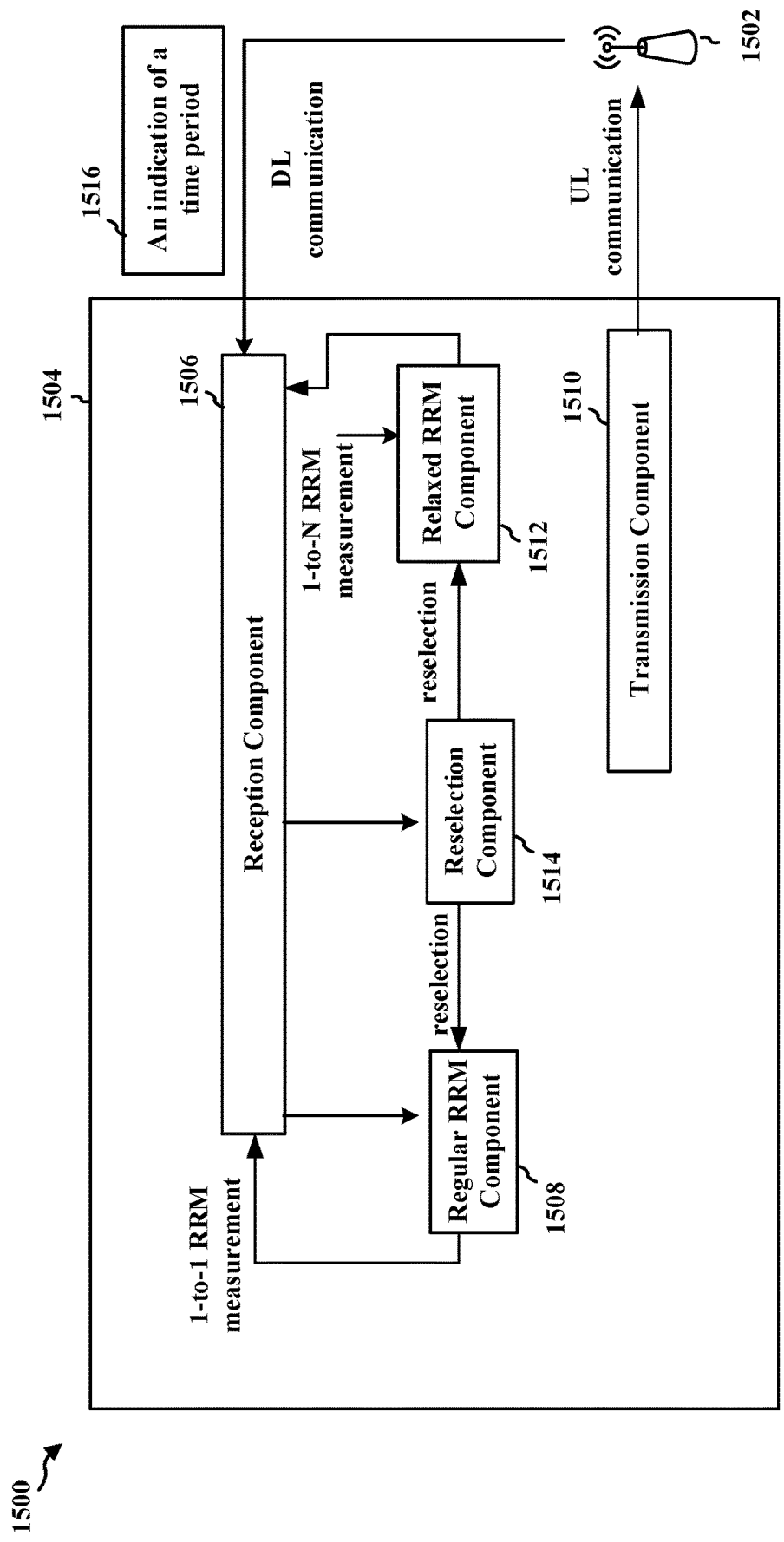
FIG. 15 is a conceptual data flow diagram illustrating the data flow between different means/components in an example apparatus.

FIG. 15 is a conceptual data flow diagram 1500 illustrating the data flow between different means/components in an exemplary apparatus 1504. The apparatus 1504 may be a UE (e.g., UE 104, 350, 404, 704, 904) communicating with a base station 1502 (e.g., base station 102, 180, 402, 702, the apparatus 902, 902'). The wireless communication may comprise 5G NR communication, e.g., NB-IoT and/or eMTC communication, as described herein. The apparatus 1504 includes a reception component 1506 to receive downlink communication, from a base station 1502 and a transmission component 1510 configured to transmit uplink communication to the base station 1502. The apparatus 1504 includes a relaxed RRM component 1512 configured to enter a relaxed RRM measurement mode and to perform a single RRM measurement for more than one DRX cycle. The apparatus includes a reselection component 1514 configured to reselect to a second cell that supports the relaxed RRM measurement. The apparatus includes a regular RRM component 1508 configured to return to a regular RRM measurement for a time period, wherein the regular RRM measurement comprises one RRM measurement for each DRX cycle.

For example, the time period may be based on an indication 1516 received from the base station 1502 via the broadcast system information. The time period may be calculated based on configuration parameters for the relaxed RRM measurement received from the base station 1502 via a broadcast system information. The base station 1502 may explicitly or implicitly send the indication 1516 of the time period for the apparatus 1504 to keep regular RRM measurement before go back to the relaxed RRM measurement. For example, the base station 1502 may define M*DRX cycles for the apparatus 1504 to perform regular RRM measurement until the next relaxed RRM measurement.

As another example, the time period may be based at least in part on a predefined minimum duration. For example, the minimum duration may comprise a time length for the apparatus 1504 to perform an RRM measurement to meet an accuracy requirement. The minimum duration may be based on the time that apparatus 1504 requires to get RRM measurement (e.g., RSRP) to achieve the accuracy requirement. For another example, the minimum duration may comprises a time length corresponding to apparatus 1504 being identified as a low mobility UE. Based on the RRM measurement of the second cell, the UE may be identified as a low-mobility UE and the relaxed RRM measurement relaxation may be applied based on the second cell's configuration (RSRP may be changed).

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
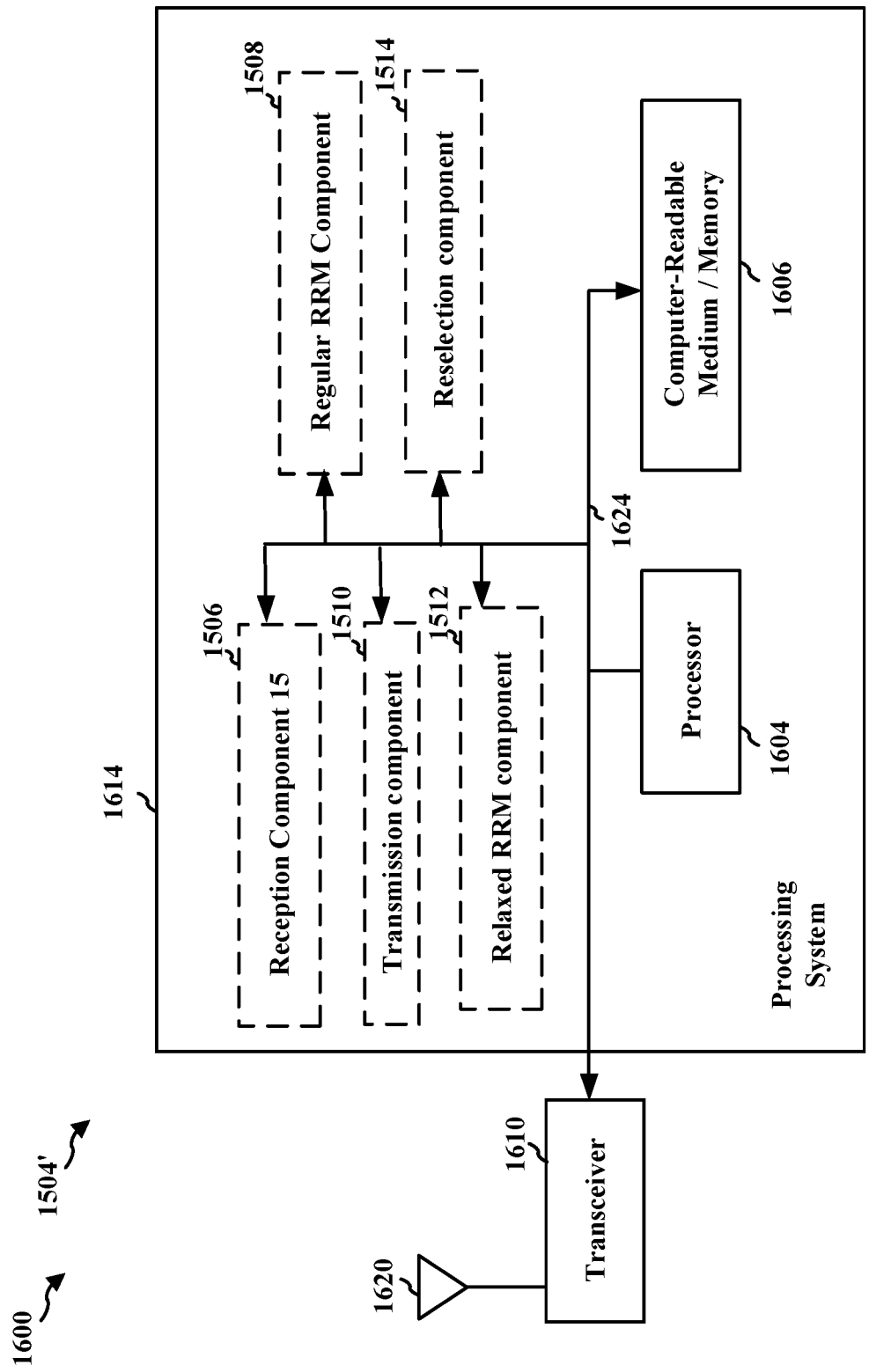
FIG. 16 is a diagram illustrating an example of a hardware implementation for an apparatus employing a processing system.

FIG. 16 is a diagram 1600 illustrating an example of a hardware implementation for an apparatus 1504' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1604. In addition, the transceiver 1610 receives information from the processing system 1614, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1506, 1508, 1510, 1512, 1514. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1504/1504' for wireless communication includes means for entering a relaxed Radio Resource Management (RRM) measurement with a first cell, where the relaxed RRM measurement comprises a single RRM measurement for more than one DRX cycle; means for reselecting to a second cell that supports the relaxed RRM measurement; means for returning to a regular RRM measurement for a time period, wherein the regular RRM measurement comprises one RRM measurement for each DRX cycle. The aforementioned means may be one or more of the aforementioned components of the apparatus 1504 and/or the processing system 1614 of the apparatus 1504' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
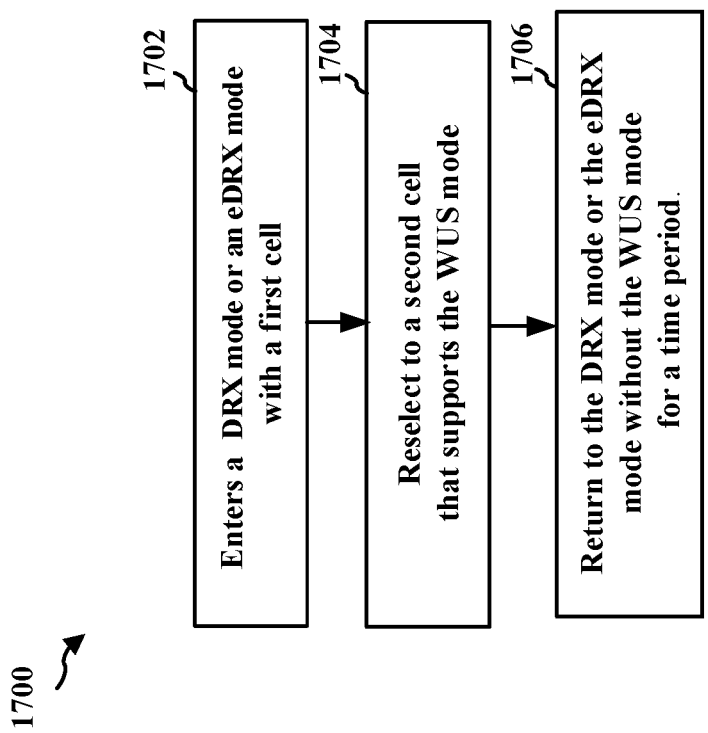
FIG. 17 is a flowchart of yet another method of wireless communication.

FIG. 17 is a flowchart of another example of a method 1700 of wireless communication to solve the problem of proper UE behavior after reselecting an new cell. The method may be performed by a UE (e.g., UE 104, 350, 404, 604, 904) communicating with a base station (e.g., base station 102, 180, 402, 702, 902, 902'). The wireless communication may comprise 5G NR communication, as described herein. Optional aspects are illustrated with a dashed line. The method provides a solution to problems that may arise when a UE in DRX mode or eDRX mode moves to a new cell. The method provides additional configuration of the UE that may be advantageous to ensure the accuracy of the RRM measurement.

At 1702, the UE enters a DRX mode or an eDRX mode, where the DRX mode or the eDRX mode comprising a WUS mode with a first cell. FIGS. 21A and 21B illustrate example aspects of DRX modes and eDRX modes.

At 1704, the UE may reselect a second cell and get the system information in MIB/SIB. If the second cell does not support WUS, the UE may fall back to the non-WUS mode (or without a WUS mode), where the UE directly detects paging every DRX cycle.

At 1706, the UE returns to the DRX mode or the eDRX mode without the WUS mode for a time period. Even if the first cell and the second cell both support the WUS mode, the UE still needs fall back to no WUS mode (e.g., in order to directly detect PDCCH for paging) after cell re-selection for a time period. Though the WUS mode may enable the UE to save power, if the UE misses the WUS for the new cell, the UE may miss the paging occasion creating undesirable latency. Thus, the time period during which the UE returns to a mode without WUS may be important for the UE to behave properly and save power, after reselecting to the second cell. Note that the UE follows the configuration of the second cell after the cell reselection. For 1-to-N mapping between WUS and associated POs for eDRX mode, the N*DRX configured by the second cell may be same as that of a first cell or different.

For example, the time period may be based on an indication received from a base station via the broadcast system information. The time period may be based on a predefined minimum duration. The base station may explicitly indicate the time period or the predefined minimum duration for the UE to keep no WUS mode before go back to WUS mode. Alternatively, the time period or minimum time period may be based on the indication received from MME via NSA signaling. It may be UE-specifically defined based on the UE paging response time requirement.

As another example, the time period is determined based on the parameters of a WUS configuration received from a core network entity or a base station for the UE. The base station may implicitly configure the time period for the UE to keep no WUS mode before go back to WUS mode. For example, the time period may be based on at least one of a MME latency requirement and a duration of a previous WUS detection. The period of time may be determined based on parameters of a WUS configuration received from a base station for the UE. The period of time may be determined based on a predefined lookup table based on a WUS configuration.

As yet another example, the time period may be based on a number of DRX cycles after the UE reselects to the second cell. The duration could be calculated as X*DRX cycle, where X is the number of DRX cycles after the UE reselects to the second cell. For example, when the WUS mode comprises a WUS for each DRX cycle and the time period comprises at least two DRX cycles, the UE returns to the WUS mode after the at least two DRX cycles. For the DRX mode, the 1-to-1 mapping between WUS and DRX is applied. Therefore, the UE may detect at least the next DRX cycle directly without detecting the WUS. The time duration to go back to WUS mode may be (X=2)*DRX cycles.

As another example, for the eDRX mode, the WUS mode may include a single WUS for N multiple DRX cycles, where N is a number of the multiple DRX cycles for the single WUS. Thus, a 1-to-N mapping between WUS and DRX is applied. Therefore, with N>=2, the UE may detect the DRX cycle directly until the next WUS timing.

Figure 18A:
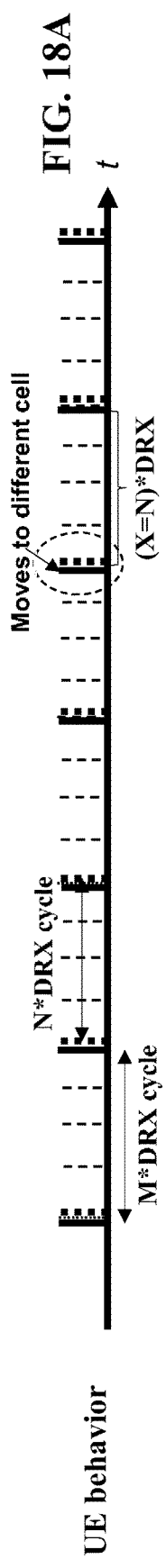
FIGS. 18A-18C illustrate a method of detecting a DRX cycle directly until the next WUS timing.
Figure 18B:
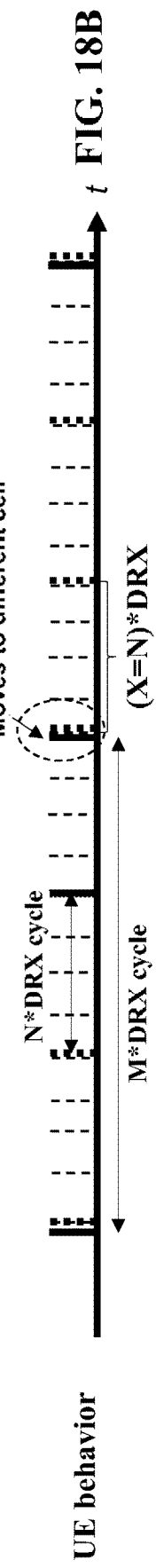
Figure 18C:
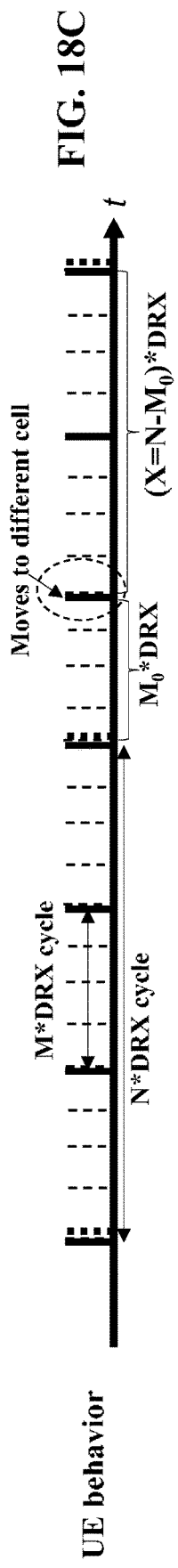

FIGS. 18A-18C illustrate the step of detecting the DRX cycle directly until the next WUS timing 1720 in further detail. The WUS mode may comprise a single WUS for N multiple DRX cycles, and the eDRX mode may comprise a relaxed RRM measurement mode having a single RRM measurement for every M DRX cycles, where M is a number of cycles for the relaxed RRM measurement. As shown in FIG. 18A and FIG. 18B, the time period X before the UE will go back to the WUS mode may be X=N*DRX cycles when N≤M. The UE may directly detect each DRX cycle until the next WUS transmitted at the N DRX cycle. The time period may correspond to N DRX cycles.

As shown in FIG. 18C, when N>M, the UE may directly detect each DRX cycle until the next WUS transmission at N*DRX cycle, in order to reduce the latency of waiting for the next WUS timing in the second cell if the WUS is enabled in the second cell as well. The time period before the UE may go back to the WUS mode may be X=(N−$M_0$) *DRX cycles, (or X=max(2, N−$M_0$))*DRX), where $M_0$ refers to the RRM measurement at which the UE reselects to the second cell. $M_0$*DRX is the time between the previous RRM measurement relative to the last WUS detection time.

Figure 19:
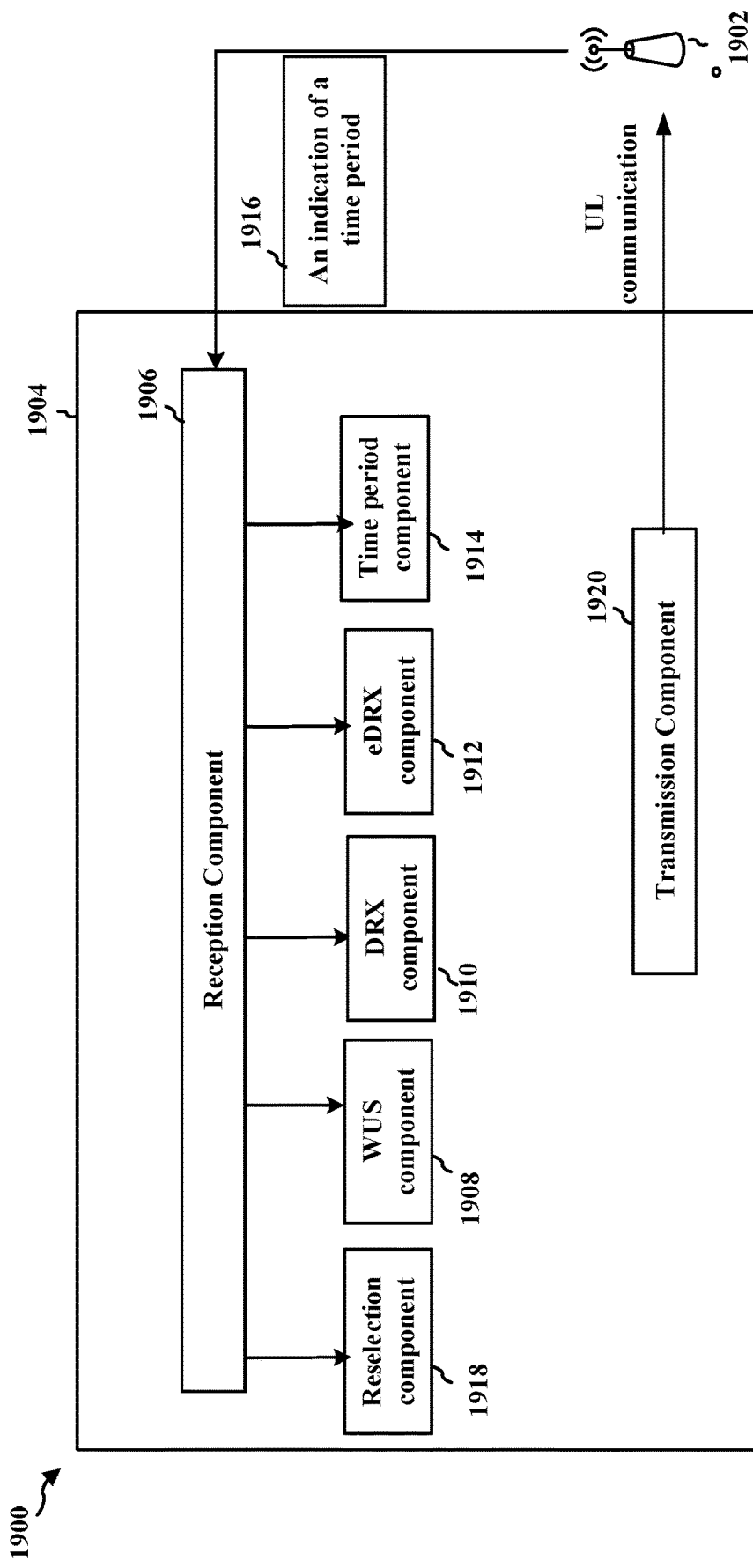
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1904. The apparatus 1904 may be a UE (e.g., UE 104, 350, 404, 704, 904) communicating with a base station 1902 (e.g., base station 102, 180, 402, 702, the apparatus 902, 902'). The wireless communication may comprise 5G NR communication, as described herein. The apparatus 1904 includes a reception component 1906 to receive downlink communication from a base station 1902 and a transmission component configured to transmit uplink communication to the base station. The apparatus 1904 includes a WUS component 1908, a DRX component 1910, an eDRX component 1912, a time period component 1914, and a reselection component 1918.

The DRX component is configured to enter a DRX mode comprising a WUS mode with a first cell. The eDRX component 1912 is configured to enter an eDRX mode comprising a WUS mode, with a first cell. Reselection component 1918 is configured to reselect to a second cell that supports the WUS mode. The WUS component 1908 is configured to return to the DRX mode or the eDRX mode without the WUS mode for a time period, which may be determined by the time period component 1914.

The time period may be based on an indication received from a base station via the broadcast system information. The time period may be based on a predefined minimum duration. The base station 1902 may explicitly indicate the time period or the predefined minimum duration for the UE to keep no WUS mode before go back to WUS mode. The time period may also be determined based on the parameters of a WUS configuration received from a core network entity or a base station for the UE. The base station 1902 may implicitly configure the time period for the apparatus 1904 to keep no WUS mode before go back to WUS mode. For example, the time period may be based on at least one of a MME latency requirement and a duration of a previous WUS detection. The period of time may be determined based on parameters of a WUS configuration received from a base station for the apparatus 1904. The period of time may be determined based on a predefined lookup table based on a WUS configuration.

For example, the time period may be based on a number of DRX cycles after the apparatus 1904 reselects to the second cell. The duration may be calculated as X*DRX cycle, where X is the number of DRX cycles after the UE reselects to the second cell. For example, when the WUS mode comprises a WUS for each DRX cycle and the time period comprises at least two DRX cycles, the apparatus 1904 returns to the WUS mode after the at least two DRX cycles. For the DRX mode, the 1-to-1 mapping between WUS and DRX is applied. Therefore, the apparatus 1904 may detect at least the next DRX cycle directly without detecting the WUS. The time duration to go back to WUS mode may be (X=2)*DRX cycles.

For another example, for the eDRX mode, the WUS mode may include a single WUS for N multiple DRX cycles, where N is a number of the multiple DRX cycles for the single WUS. 1-to-N mapping between WUS and DRX is applied. Therefore, with N>=2, the apparatus 1904 may detect the DRX cycle directly until the next WUS timing. The WUS mode may comprise a single WUS for N multiple DRX cycles, and the eDRX mode may comprise a relaxed RRM measurement having a single RRM measurement for every M DRX cycles. The time period X to go back to the WUS mode may be N*DRX cycles when N<=M. The apparatus 1904 may directly detect each DRX cycle until the next WUS transmitted at the N DRX cycle. The time period may correspond to N DRX cycles. When N>M, the apparatus 1904 may directly detect each DRX cycle until the next WUS transmission at N*DRX cycle, in order to reduce the latency of waiting for the next WUS timing in the second cell if the WUS is enabled as well. The time period to go back to the WUS mode may be (N−$M_0$)*DRX cycles, where $M_0$ refers to the RRM measurement at which the apparatus 1904 reselects to the second cell.

The apparatus may include additional components that perform each of the blocks of the algorithm in the aforementioned flowcharts of FIGS. 17-18C. As such, each block in the aforementioned flowcharts of FIGS. 17-18C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
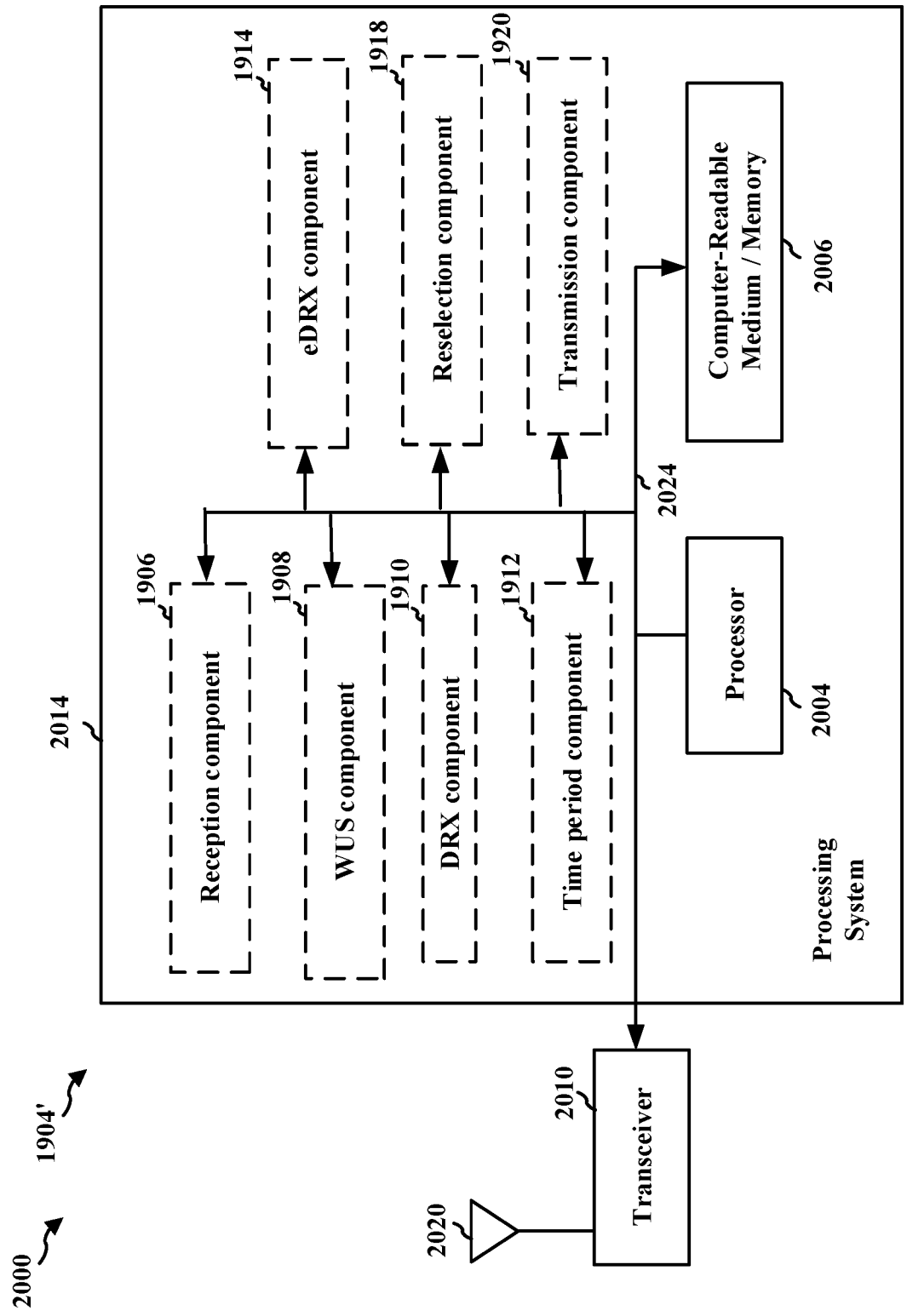
FIG. 20 is a diagram illustrating an example of a hardware implementation for an apparatus employing a processing system.

FIG. 20 is a diagram 2000 illustrating an example of a hardware implementation for an apparatus 1904' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 2008, 2010, 2012, 2014, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 2004. In addition, the transceiver 2010 receives information from the processing system 2014, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 1614 to perform the various functions described supra for any particular apparatus. The computer-readable medium/memory 2006 may also be used for storing data that is manipulated by the processor 2004 when executing software. The processing system 2014 further includes at least one of the components 2008, 2010, 2012, 2014. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1904/1904' for wireless communication includes means for entering a discontinuous reception (DRX) mode or an extended discontinuous reception (DRX) mode, the DRX mode or the eDRX mode comprising a wake up signal (WUS) mode with a first cell; means for reselecting to a second cell that supports the WUS mode; means for returning to the DRX mode or the eDRX mode without the WUS mode for a time period after the reselecting to the second cell. The aforementioned means may be one or more of the aforementioned components of the apparatus 1904 and/or the processing system 2014 of the apparatus 1904' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a base station, comprising:
    receiving, from a network entity, an indication that a user equipment (UE) is operating in one of a discontinuous reception (DRX) mode or an extended DRX (eDRX) mode; and
    configuring, for the UE, a wake up signal (WUS) mode based on the indication that the UE is operating in the DRX mode or the eDRX mode, the WUS mode being configured using a first WUS configuration indicating a mapping between a WUS and a paging occasion associated with the WUS based on the indication indicating that the UE is operating in the DRX mode and using a second WUS configuration that includes a pre-defined look-up table entry indicating a specified number of multiple paging occasions that map to the WUS based on the indication indicating that the UE is operating in the eDRX mode.

2. The method of claim 1, wherein the WUS mode includes the WUS mapping to the paging occasion associated with the WUS based on the indication indicating that the UE is operating in the DRX mode.

3. The method of claim 2, wherein the indication indicates that the UE is operating in the DRX mode, the method further comprising:
    configuring, for the UE, a DRX cycle that includes the WUS and the paging occasion associated with the WUS bounded within the DRX cycle.

4. The method of claim 3, wherein the UE comprises a narrow band Internet-of-Things (NB-IoT) UE, the DRX cycle configured by the base station is cell specific, and the method further comprising transmitting, to the NB-IoT UE, within the DRX cycle, the WUS at the paging occasion associated with the WUS.

5. The method of claim 3, wherein the UE comprises a machine type communication (MTC) UE, the DRX cycle is specific to the MTC UE, and the method further comprising transmitting, to the MTC UE, within the DRX cycle, the WUS at the paging occasion associated with the WUS.

6. The method of claim 1, wherein the WUS mode includes the WUS mapping to the specified number of multiple paging occasions based on the indication indicating that the UE is operating in the eDRX mode.

7. The method of claim 6, wherein the mapping between the specified number of multiple paging occasions and the WUS is cell specific.

8. The method of claim 7, further comprising determining the specified number of multiple paging occasions based on one or more of a pre-defined look-up table entry indicating a paging transmission window (PTW) duration, a duration of a DRX cycle, or a duration of an eDRX cycle.

9. The method of claim 7, further comprising transmitting, in a broadcast transmission to the UE, system information indicating the specified number of multiple paging occasions.

10. An apparatus for wireless communication at a base station, comprising:
means for receiving, from a network entity, an indication that a user equipment (UE) is operating in one of a discontinuous reception (DRX) mode or an extended DRX (eDRX) mode; and
means for configuring, for the UE, a wake up signal (WUS) mode based on the indication that the UE is operating in the DRX mode or the eDRX mode, the WUS mode being configured using a first WUS configuration indicating a mapping between a WUS and a paging occasion associated with the WUS based on the indication indicating that the UE is operating in the DRX mode and using a second WUS configuration that includes a pre-defined look-up table entry indicating a specified number of multiple paging occasions that map to the WUS based on the indication indicating that the UE is operating in the eDRX mode.

11. The apparatus of claim 10, wherein the WUS mode includes the WUS mapping to the paging occasion associated with the WUS based on the indication indicating that the UE is operating in the DRX mode.

12. The apparatus of claim 11, further comprising:
means for configuring, for the UE, a DRX cycle that includes the WUS and the paging occasion associated with the WUS bounded within the DRX cycle, wherein the indication indicates that the UE is operating in the DRX mode.

13. The apparatus of claim 12, wherein the means for configuring the DRX cycle is configured to be cell specific for a narrow band Internet-of-Things (NB-IoT) UE.

14. The apparatus of claim 12, wherein the means for configuring the DRX cycle is configured to be UE specific for a machine type communication (MTC) UE.

15. The apparatus of claim 10, wherein the WUS mode includes the WUS mapping to the specified number of multiple paging occasions based on the indication indicating that the UE is operating in the eDRX mode.

16. The apparatus of claim 15, wherein the mapping between the specified number of multiple paging occasions and the WUS is cell specific.

17. The apparatus of claim 15, further comprising means for transmitting, in a broadcast transmission to the UE, a system information block indicating the specified number of multiple paging occasions.

18. An apparatus for wireless communication at a base station, comprising:
a memory; and
at least one processor coupled to the memory and configured to:
receive, from a network entity, an indication that a user equipment (UE) is operating in one of a discontinuous reception (DRX) mode or an extended DRX (eDRX) mode; and
configure, for the UE, a wake up signal (WUS) mode based on the indication that the UE is operating in the DRX mode or the eDRX mode, the WUS mode being configured using a first WUS configuration indicating a mapping between a WUS and a paging occasion associated with the WUS based on the indication indicating that the UE is operating in the DRX mode and using a second WUS configuration that includes a pre-defined look-up table entry indicating a specified number of multiple paging occasions that map to the WUS based on the indication indicating that the UE is operating in the eDRX mode.

19. The apparatus of claim 18, wherein the WUS mode includes the WUS mapping to the paging occasion associated with the WUS based on the indication indicating that the UE is operating in the DRX mode.

20. The apparatus of claim 18, wherein the at least one processor is further configured to:
Configure, for the UE, a DRX cycle that includes the WUS and the paging occasion associated with the WUS bounded within the DRX cycle, wherein the indication indicates that the UE is operating in the DRX mode.

21. The apparatus of claim 18, wherein the WUS mode includes the WUS mapping to the specified number of multiple paging occasions based on the indication indicating that the UE is operating in the eDRX mode.

22. The apparatus of claim 21, wherein the mapping between the specified number of multiple paging occasions and the WUS is cell specific.

23. A non-transitory computer-readable medium storing computer executable code for wireless communication at a base station (BS), comprising code, which when executed by at least one processor, causes the BS to:
receive, from a network entity, an indication that a user equipment (UE) is operating in one of a discontinuous reception (DRX) mode or an extended DRX (eDRX) mode; and
configure, for the UE, a wake up signal (WUS) mode based on the indication that the UE is operating in the DRX mode or the eDRX mode, the WUS mode being configured using a first WUS configuration indicating a mapping between a WUS and a paging occasion associated with the WUS based on the indication indicating that the UE is operating in the DRX mode and using a second WUS configuration that includes a pre-defined look-up table entry indicating a specified number of multiple paging occasions that map to the WUS based on the indication indicating that the UE is operating in the eDRX mode.

24. The non-transitory computer-readable medium of claim 23, wherein the WUS mode includes the WUS mapping to the paging occasion associated with the WUS based on the indication indicating that the UE is operating in the DRX mode.

25. The non-transitory computer-readable medium of claim 24, further comprising code, which when executed by the at least one processor, causes the BS to:
configure, for the UE, a DRX cycle that includes the WUS and the paging occasion associated with the WUS bounded within the DRX cycle, wherein the indication indicates that the UE is operating in the DRX mode.

26. The non-transitory computer-readable medium of claim 23, wherein the WUS mode includes the WUS mapping to the specified number of multiple paging occasions based on the indication indicating that the UE is operating in the eDRX mode.

27. The non-transitory computer-readable medium of claim 26, wherein the mapping between the specified number of multiple paging occasions and the WUS is cell specific.

28. A method of wireless communication performed by a User Equipment (UE), comprising:
receiving, from a base station, a first wake up signal (WUS) configuration for a discontinuous reception (DRX) mode indicating a mapping between a WUS and a paging occasion associated with the WUS and a second WUS configuration for an extended DRX (eDRX) mode that includes a pre-defined look-up table entry indicating a specified number of multiple paging occasions that map to the WUS; and
listening for the WUS prior to the paging occasion based on the first WUS configuration or the second WUS configuration.

29. The method of claim 28, further comprising receiving the WUS at the paging occasion associated with the WUS based on the UE operating in the DRX mode.

30. The method of claim 29, wherein the UE is operating in a DRX mode, the method further comprising:
receiving, from the base station, a DRX cycle configuration that includes the WUS and the paging occasion associated with the WUS bounded within a DRX cycle.

31. The method of claim 30, wherein the UE comprises a narrow band Internet-of-Things (NB-IoT) UE, the DRX cycle configured by the base station is cell specific, and the method further comprising determining that the WUS is scheduled to be transmitted at the paging occasion associated with the WUS within the DRX cycle.

32. The method of claim 30, wherein the UE comprises a machine type communication (MTC) UE, the DRX cycle is specific to the MTC UE, and the method further comprising determining that the WUS is scheduled to be transmitted at the paging occasion associated with the WUS within the DRX cycle.

33. The method of claim 28, further comprising receiving the WUS at one or more of the specified number of multiple paging occasions based on the UE operating in the eDRX mode.

34. The method of claim 33, wherein the mapping between the specified number of multiple paging occasions and the WUS is cell specific.

35. The method of claim 34, wherein the mapping of the specified number of multiple paging occasions is based on one or more of a pre-defined look-up table entry indicating a paging transmission window (PTW) duration, a duration of a DRX cycle, or a duration of an eDRX cycle.

36. The method of claim 34, further comprising:
receiving, in a broadcast transmission to the UE, system information comprising an indication of the specified number of multiple paging occasions.

37. An apparatus for wireless communication at a User Equipment (UE), comprising:
means for receiving, from a base station, a first wake up signal (WUS) configuration for a discontinuous reception (DRX) mode indicating a mapping between a WUS and a paging occasion associated with the WUS and a second WUS configuration for an extended DRX (eDRX) mode that includes a pre-defined look-up table entry indicating a specified number of multiple paging occasions that map to the WUS; and
means for listening for the WUS prior to the paging occasion based on the first WUS configuration or the second WUS configuration.

38. The apparatus of claim 37, further comprising:
means for receiving a DRX cycle configuration that includes the WUS and the paging occasion associated with the WUS bounded within a DRX cycle, wherein the UE is operating in the DRX mode.

39. The apparatus of claim 37, further comprising: means for receiving the WUS at one or more of the specified number of multiple paging occasions based on the UE operating in the eDRX mode.

40. The apparatus of claim 39, further comprising:
means for receiving, in a broadcast transmission to the UE, system information comprising an indication of the specified number of multiple paging occasions.

41. An apparatus for wireless communication at a user equipment (UE), comprising:
a memory; and
at least one processor coupled to the memory and configured to:
receive, from a base station, a first wake up signal (WUS) configuration for a discontinuous reception (DRX) mode indicating a mapping between a WUS and a paging occasion associated with the WUS and a second WUS configuration for an extended DRX (eDRX) mode that includes a pre-defined look-up table entry indicating a specified number of multiple paging occasions that map to the WUS; and
listen for the WUS prior to the paging occasion based on the first WUS configuration or the second WUS configuration.

42. The apparatus of claim 41, wherein the at least one processor is further configured to receive a DRX cycle configuration that includes the WUS and the paging occasion associated with the WUS bounded within a DRX cycle, wherein the UE is operating in the DRX mode.

43. The apparatus of claim 41, wherein the at least one processor is further configured to receive the WUS at one or more of the specified number of multiple paging occasions based on the UE operating in the eDRX mode.

44. The apparatus of claim 43, wherein the at least one processor is further configured to receive, in a broadcast transmission to the UE, system information comprising an indication of the specified number of multiple paging occasions.

45. A non-transitory computer-readable medium storing computer executable code for wireless communication at a User Equipment (UE), comprising code to:
receive, from a base station, a first wake up signal (WUS) configuration for a discontinuous reception (DRX) mode indicating a mapping between a WUS and a paging occasion associated with the WUS and a second WUS configuration for an extended DRX (eDRX) mode that includes a pre-defined look-up table entry indicating a specified number of multiple paging occasions that map to the WUS; and listen for the WUS prior to the paging occasion based on the first WUS configuration or the second WUS configuration.

46. The non-transitory computer-readable medium of claim 45, further comprising code to receive a DRX cycle configuration that includes the WUS and the paging occasion associated with the WUS bounded within a DRX cycle, wherein the UE is operating in the DRX mode.

47. The non-transitory computer-readable medium of claim 45, further comprising code to receive the WUS at one or more of the specified number of multiple paging occasions based on the UE operating in the eDRX mode.

48. The non-transitory computer-readable medium of claim 47, further comprising code to receive, in a broadcast transmission to the UE, system information comprising an indication of the specified number of multiple paging occasions.

* * * * *